United States Patent [19]

Binkley et al.

[11] Patent Number: 5,062,042
[45] Date of Patent: Oct. 29, 1991

[54] SYSTEM FOR MANAGING DATA WHICH IS ACCESSIBLE BY FILE ADDRESS OR DISK ADDRESS VIA A DISK TRACK MAP

[75] Inventors: Joseph H. Binkley; Perry A. Caro, both of Palo Alto; Charles R. Fay, Long Beach; Jeffery W. Lee, Sunnyvale; Everett T. Neely, Montara; Geoffrey O. Thompson, Palo Alto; Gaya Vukkadala, Sunnyvale, all of Calif.

[73] Assignee: Xerox Corporation, Stamford, Conn.

[21] Appl. No.: 497,468

[22] Filed: Mar. 22, 1990

Related U.S. Application Data

[62] Division of Ser. No. 856,526, Apr. 28, 1986, abandoned.

[51] Int. Cl.[5] .............................................. G06F 12/02
[52] U.S. Cl. ................................ 364/200; 364/246.3; 364/256.4; 364/261.2; 364/254.8
[58] Field of Search ... 364/200 MS File, 900 MS File

[56] References Cited

U.S. PATENT DOCUMENTS

| | | | |
|---|---|---|---|
| 4,253,145 | 2/1981 | Goldberg | 364/200 |
| 4,617,624 | 10/1986 | Goodman | 364/200 |
| 4,642,759 | 2/1987 | Foster | 364/200 |
| 4,787,026 | 11/1988 | Barnes et al. | 364/200 |
| 4,792,896 | 12/1988 | MacLean et al. | 364/200 |
| 4,849,878 | 7/1989 | Roy | 364/200 |
| 4,899,136 | 2/1990 | Beard et al. | 340/706 |
| 4,937,036 | 6/1990 | Beard et al. | 340/706 |
| 4,939,507 | 7/1990 | Beard et al. | 340/706 |

FOREIGN PATENT DOCUMENTS 2119977 11/1983 United Kingdom .

OTHER PUBLICATIONS

"Accessing Files on Emulated PC Disks at a Host Computer", IBM TDB, vol. 28, No. 6, Nov. 1985, pp. 2752-2754.
"M8.0 Operating System Software Bulletin", Xerox Corporation.
"Copydisk", Xerox Corp., Palo Alto, 1980.
Madnick, Stuart E. et al., "Operating Systems", McGraw-Hill Book Company, 1974, pp. 549-563.
Hall, Dennis E., et al., "A Virtual Operating System", *Communications of the ACM*, vol. 23, No. 9, Sep. 1980, pp. 495-502.
Krishnamurty, R. and Mothersole, T., "Coprocessor Software Support", *IBM Personal Computer Technology*, IBM, Austin, 1986, pp. 142-146.
Deitel, Harvey M., "An Introduction to Operating Systems", Addison-Wesley Publishing Company, Inc., Revised First Edition, Jul. 1984, pp. 601-629.

*Primary Examiner*—Thomas C. Lee
*Attorney, Agent, or Firm*—James T. Beran

[57] ABSTRACT

An emulating data processor includes a host sytem and an emulating processor with outputs to and inputs from the host system. An input/output processor handles I/O operation requests of the emulating processor, using the host system I/O devices to emulate some of the PC I/O devices. Floppy operations may be handled either by a floppy disk controller like that of the PC or by a software controller of a file in host rigid disk memory which may be accessed as a PC floppy disk, so that a data structure containing parameters of the operation is loaded and provided to the appropriate controller. Rigid disk operations are handled by another file in host rigid disk memory which may be accessed as a PC rigid disk, and an appropriate I/O operating system routine is provided so that the emulating processor can pass the operation parameters through to the host rigid disk controller in a group of registers.

12 Claims, 23 Drawing Sheets

SYSTEM FOR MANAGING DATA WHICH IS ACCESSIBLE BY FILE ADDRESS OR DISK ADDRESS VIA A DISK TRACK MAP

This is a division of application Ser. No. 856,526, filed Apr. 28, 1986, now abandoned.

BACKGROUND OF THE INVENTION

The present invention relates to the emulation of one data processing system by another. More specifically, the present invention relates to the modification of a *host* data processing system to emulate another, dissimilar *target* system with a central processor (CPU) which is capable of executing a set of instructions different than those executable by the host system's CPU.

Many techniques for emulating a target data processing system are known. Such a technique may alternatively be described as a simulation of the target system, as making another system compatible with the target system, or as providing the target system as a virtual machine on a host system. U.S. Pat. No. 4,253,145 contains a helpful discussion of virtual machines in the prior art, most of which simulate mainframe computers so that programs written for the simulated computer can be run on the virtual machine.

In recent years, a vast amount of software has been written for a microprocessor-based data processing system called the IBM PC or IBM PC XT ("PC"), produced by International Business Machines Corporation. In order to make their products more useful, many manufacturers have developed systems which are either equivalent to the PC or can be made to operate in an equivalent manner by the use of software. Hardware and software technology have progressed rapidly, however, so that systems far more powerful than the PC can be produced for roughly the same cost. To devote such a system to the running of PC software is to sacrifice capabilities it could otherwise have. Therefore, it would be useful to have a technique for modifying one of these more powerful systems so that it could run software written for the PC without limiting its other capabilities.

SUMMARY OF THE INVENTION

The present invention provides techniques for modifying a system so that it can run PC software while retaining its own characteristic capabilities. For example, the present invention makes it possible for a host system capable of displaying more information than a PC to display within its own characteristic display all the information a PC would provide on its display, making that information available for manipulation by an operator using the features of the more powerful host system. Furthermore, the present invention makes it possible to execute PC software in such a manner that if the PC software cannot be executed, and therefore results in a crash, the host system will be protected and will continue to operate with full capabilities.

The present invention combines a host system with an emulating processor which is capable of running software for a target system. The emulating processor is added so as not to prevent the host system CPU from performing its own indepenent operations while the emulating processor is operating, even though the two processors have different instruction sets. Also, the host system can provide an external interface which includes the features of an external interface of the target system while retaining those of the host system. For example, the host system can provide a display which includes the target system display but retains the display features of the host system.

The emulating processor is thus added in a manner which protects the host system CPU from crashes in the target system software, since the host system CPU is not executing the software which leads to the crash and may continue with its independent operation. Rather than being surrounded by the devices found in the target system, the emulating processor provides its output signals to the host system and receives input signals from the host system. Those input signals from the host system enable the emulating processor to continue to run target system software. The host system continues to operate as an independent system while supporting emulation of the environment which the emulating processor would have if it were the central processor of the target system. The host system CPU can therefore continue to operate indendently with its own capabilities despite failure of the emulating processor due to defective or malicious software.

The target system includes a set of devices which provides an environment, referred to as its processor environment, in which the target system's central processor executes. According to a further aspect of the invention, the host system provides an equivalent environment to the emulating processor by providing input signals to the emulating processor corresponding to the input signals provided by the target system devices and by accepting output signals from the emulating processor. The host system may include circuitry which monitors the emulating processor for an output requesting an I/O operation and provides an I/O signal. The host system may further include emulating means for emulating that target system device in response to the I/O signal. The independent operations of the host processor may include I/O operations making use of I/O devices which are also used to emulate the target system devices. A target system device which is a memory medium may be emulated using a host system file which can also be accessed by the emulating processor as a memory medium. This memory medium file may be used to transfer data under the control of one processor to the control of the other, by selecting a screen object providing access to the file, by indicating a destination such as an emulated I/O device used by the emulating processor to access that type of memory medium and by providing the file to the destination processor.

These and other objects, features and advantages of the invention will become more apparent from the attached drawings together with the following description and the appended claims.

DETAILED DESCRIPTION OF THE PREFERRED EMBODIMENTS

I. General Features

Figure 1:
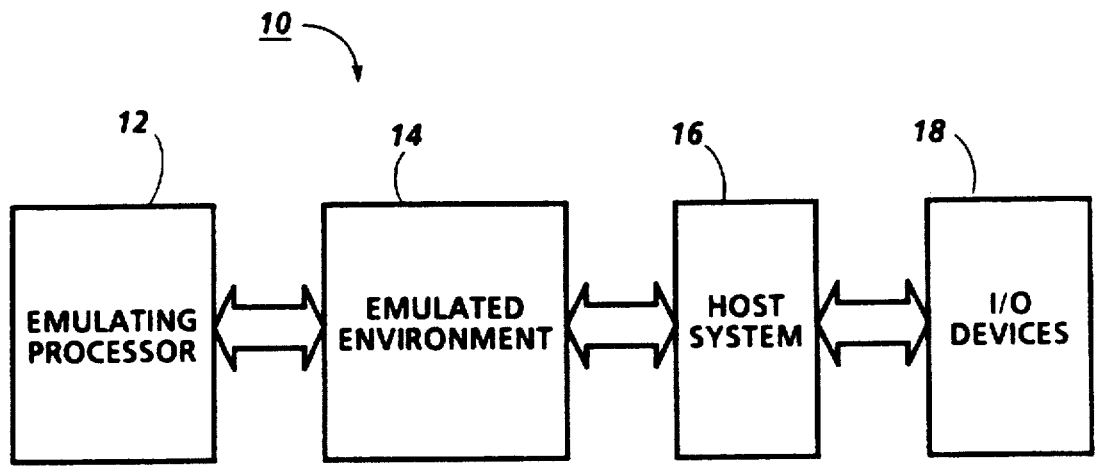
FIG. 1 is a functional block diagram showing the major components of an emulating system according to the invention.
Figure 2:
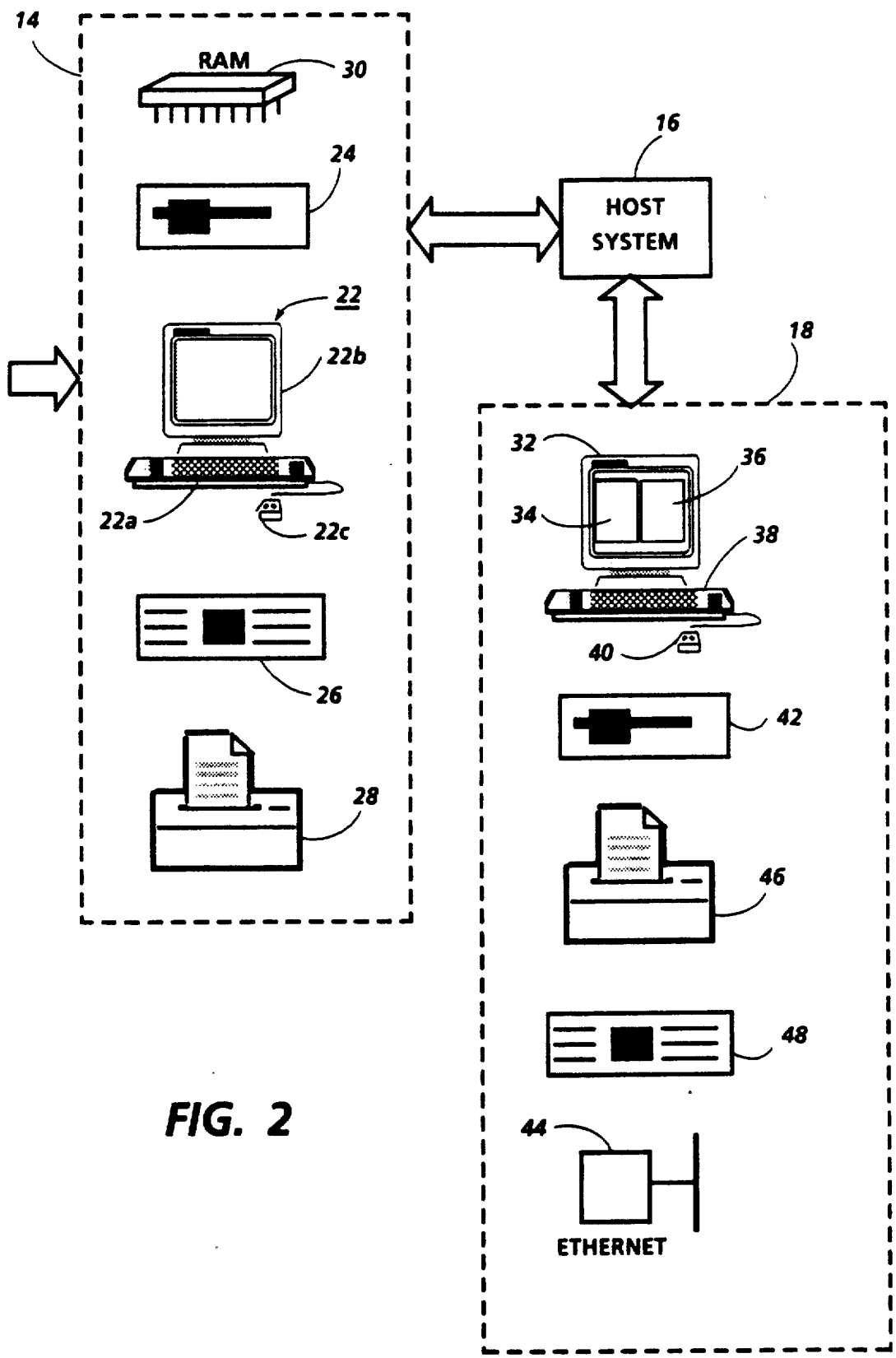
FIG. 2 is a schematic diagram illustrating emulation of the processor environment and user interface of a target system.

The general features of the invention can be understood from FIGS. 1–6. FIGS. 1 and 2 show features of systems according to the invention, while FIGS. 3–6 show features of methods according to the invention.

FIG. 1 shows the basic functional blocks of a data processing system according to the invention. As noted above, the underlying problem is that modifying a system to emulate another system ("the target system") usually sacrifices some capabilities of the system being modified. This problem is particularly acute when the system being modified is much more powerful and versatile than the target system, so that valuable capabilities are lost during emulation. System 10 in FIG. 1, however, solves this problem by providing emulation without loss of capabilities.

The focus of emulation in system 10 is the emulating processor 12, which is capable of executing sequences of the same instructions which the central processor of the target system can execute. This means that if one of those sequences of instructions is presented to the emulating processor 12, it will perform operations which permit it to continue to execute that sequence until the sequence is completed. While executing, it will provide output signals and receive input signals.

If emulating processor 12 were in fact the central processor of the target system, it would be connected to a set of devices which would provide a processor environment, receiving its output signals and, in response, providing appropriate input signals to it. Therefore, even though emulating processor 12 is capable of executing sequences of the same instructions as the target system central processor, it must also be in an environment which is equivalent to the processor environment. The emulated environment 14 in FIG. 1 represents this environment, which is in effect an interface which receives output signals from and, in response, provides input signals to emulating processor 12 corresponding to the input signals which would be provided by the set of devices in the target system. As a result, emulating processor 12 can continue to execute the sequence of instructions as if it were the target system central processor.

Emulated environment 14, rather than being provided by a set of devices as in the target system, is provided by host system 16, the system which is modified for emulation. As discussed below in greater detail, host system 16 is modified by a combination of hardware and software to provide appropriate input signals in response to output signals from emulating processor 12. These modifications are made without sacrificing the capabilities of host system 16, but rather by supplementing its capabilities, so that the resulting system has more capabilities than host system 16 by itself.

FIG. 1 also shows input and output (I/O) devices 18 connected to host system 16. Emulation would be somewhat cumbersome, however, if the user were unable to treat host system 16 as if it were the target system being emulated. Therefore, an important additional feature of the invention is to emulate the target processor's user interface in a manner which does not sacrifice the capabilities of host system 16.

FIG. 2 shows in more detail the emulated environment 14 and the I/O devices 18 which provide the emulated user interface, all supported by host system 16. The emulated environment 14 includes emulated terminal 22, with emulated keyboard 22a and emulated display monitor 22b. It would also be possible to include emulated mouse 22c as part of emulated terminal 22. Emulated environment 14 may also include emulated floppy disk drive 24, emulated fixed or rigid disk 26 and emulated printer 28. Emulated environment 14 further includes emulated main memory 30 and also includes a number of other emulated devices or components discussed below. Referring to each of these devices as "emulated" implies only that they appear to the emulating processor 12 as if an equivalent actual device were connected to it. System 10 may not in fact include a corresponding actual device, or the corresponding actual device may not in fact be involved in the operation of an emulated device. In other words, host system 16 is capable of providing input signals to emulating processor 12 in the same manner as any of the emulated devices were it present.

The actual I/O devices 18 also emulate the user interface of the target system in the manner illustrated in FIG. 2. Of particular importance is display 32, which may emulate the target system's display within a part 34 of its screen, referred to as a window. At the same time, display 32 may continue to provide the host system's display in the background around window 34, in window 36 and elsewhere on the screen. Keyboard 38, mouse 40 and floppy disk drive 42 emulate the target system user interface differently, by being operable in the conventional manner by host system 16, but with host system 16 converting input data from and output data to these devices as if they were the corresponding devices in the target system. In other words, host system 16 interprets keystrokes, mouse clicks and data read from a floppy as if they were coming respectively from the target system keyboard, mouse and floppy disk drive. Network or Ethernet connection 44 may also be provided, permitting access to remote printers or workstations. Local printer 46 could also be provided, and it may be fed data as if it were the target system printer. The rigid disk 48 also participates in user interface emulation by providing an emulated rigid disk and virtual floppy disks which the user may treat as if they were part of the target system.

The specific emulated devices and actual I/O devices shown in FIG. 2 are merely illustrative. These devices would be appropriate for emulation of an IBM PC by a Xerox 6085 workstation, but other devices could be provided for emulation of other target systems by other host systems. The basic principle of emulating the processor environment and the user interface is extremely useful for an emulation implemented according to the invention.

Figure 3:
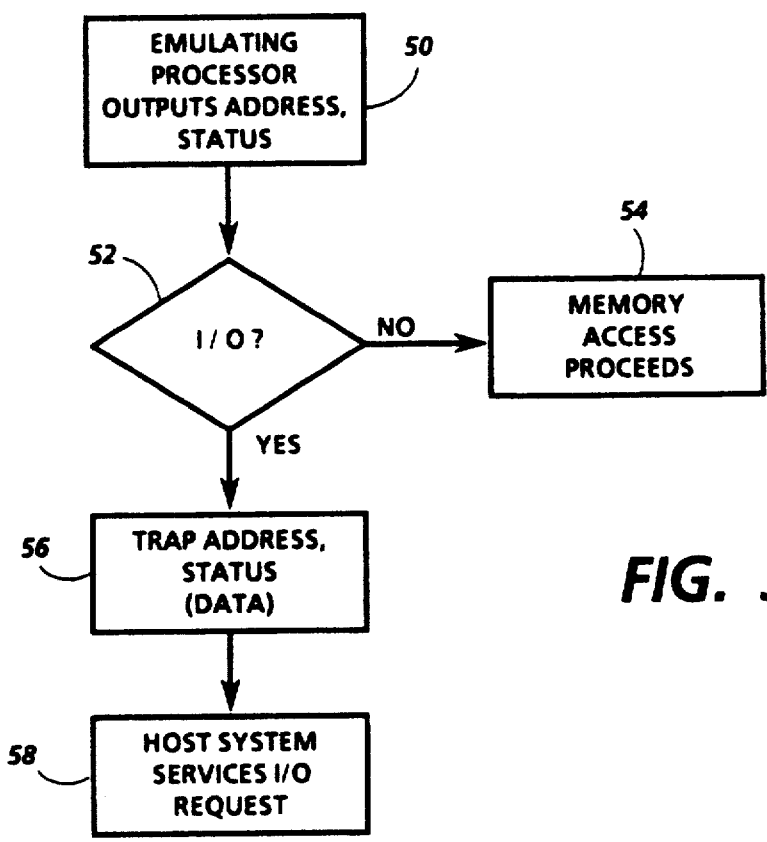
FIG. 3 is a flowchart showing basic steps in emulation of a target system's processor environment according to the invention.

FIG. 3 is a flowchart showing basic functional steps in emulation of the emulating processor's environment according to the invention. In box 50, emulating processor 12, during execution of a sequence of target system instructions, outputs information, such as an address and a number of bits of status information, indicating a type of operation. The operation may be a memory access or an I/O device operation. This information is received by a part of host system 16 which then determines in box 52 whether the requested operation is an I/O device operation.

If the requested operation is not an I/O device operation, host system 16 permits or enables the memory access by emulating processor 12 to proceed, in box 54. Emulating processor 12 may read or write to its main memory which is mapped into the host system memory as discussed below.

If the test in box 52 determines that an I/O device operation was requested, the information output by emulating processor 12 is trapped or stored, including address, status and, if an output operation is requested, data information, in box 56. Then host system 16 services the I/O request by emulating the I/O device requested, in box 58, providing appropriate inputs to enable emulating processor 12 to continue to execute the sequence of instructions.

Figure 4:
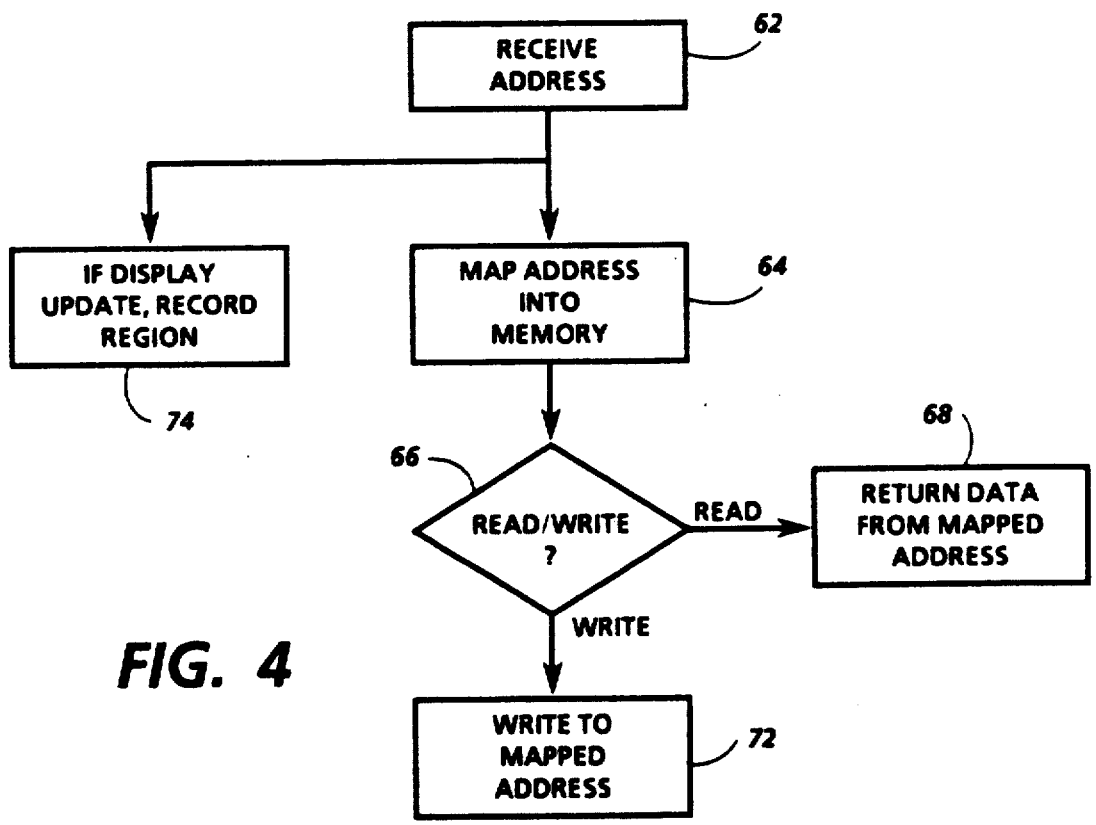
FIG. 4 is a flowchart showing a general technique for main memory emulation by memory mapping according to the invention.
Figure 5:
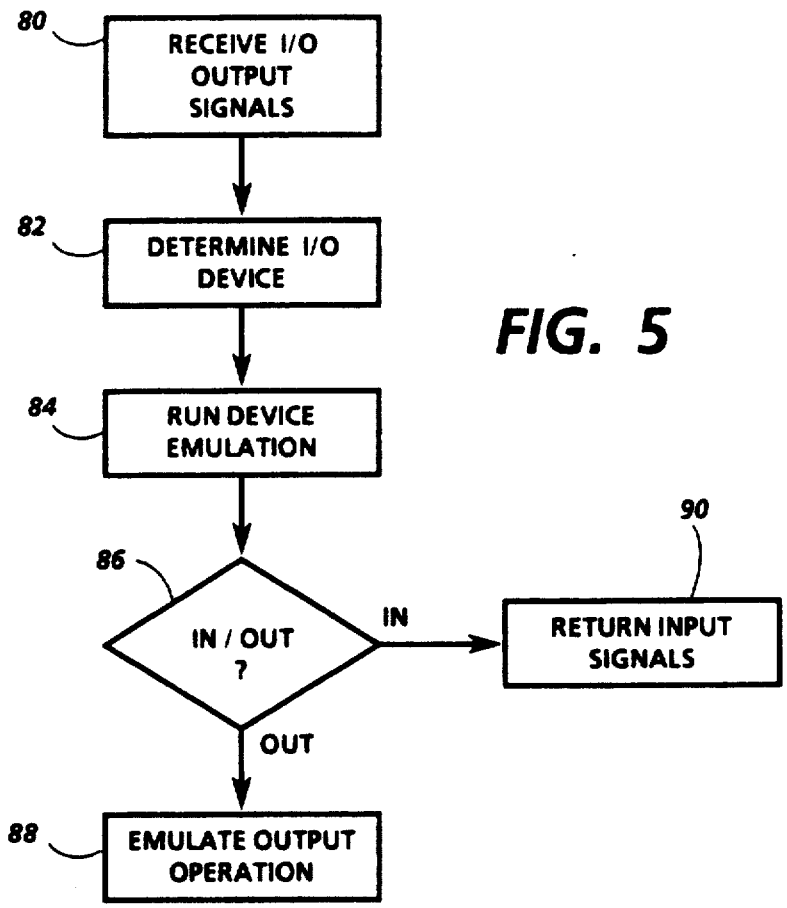
FIG. 5 is a flowchart showing a general technique for I/O device emulation according to the invention.

FIGS. 4 and 5 are generalized flowcharts showing in more detail how host system 16 performs some of the functions in FIG. 3. FIG. 4 shows how host system 16 may provide emulated main memory 30 during a memory access in box 54 in FIG. 3 and FIG. 5 shows how host system 16 may emulate an I/O device in emulated environment 14 while servicing an I/O request in box 58 in FIG. 3.

The main memory emulation technique of FIG. 4 permits host system 16 to allocate any appropriate part of memory to be the main memory for the emulating processor, while permitting host system 16 itself to also access that memory for its own purposes. In box 62, host system 16 receives an address from emulating processor 12. In box 64, host system 16 maps the address received according to an algorithm which is transparent to emulating processor 12. If emulating processor 12 calls for a read operation, as determined in box 66, host system 16 returns the data from the mapped address to emulating processor 12, as shown in box 68. But if a write operation is called for, host system 16 writes the data from emulating processor 12 to the mapped address in box 72. In box 74, concurrently with the above operations, another circuit in host system 16 receives the address and detects whether data is being written to a display bank in memory. If so, the updated display region is recorded. Subsequently, host system 16 retrieves the recorded information and updates the actual display, as discussed below in relation to FIG. 6.

FIG. 5 shows a technique for emulating an I/O device such as a floppy disk drive, keyboard, fixed disk drive, or printer. Host system 16 receives output I/O signals from emulating processor 12 in box 80, including address, status and, if an output I/O request, data, as mentioned above, and determines in box 82 to which I/O device the signals are directed. Then, in box 84, host system 16 calls a routine which emulates that device, making use of any appropriate resources actually available to host system 16, which may include a corresponding actual I/O device or dissimilar I/O devices. During the emulation routine, a test as in box 86 typically determines whether the I/O request is an output (OUT) or input (IN) request. An OUT request is typically handled by emulating the output operation, in box 88, while an IN request is typically handled by returning appropriate input signals in box 90. A number of specific emulation routines are discussed in greater detail below.

Emulating processor 12 typically accesses memory frequently, in order to retrieve its instructions and manipulate its data. I/O device operations are only requested occasionally, however, and emulating processor 12 typically operates so that the I/O device has more time in which to provide the responsive input signals. Therefore, the hardware and software implementation of memory emulation, as summarized in FIG. 4, is much different than I/O device emulation, summarized in FIG. 5, as is more fully described below.

We have already noted that the emulation of the target system's user interface is relatively straightforward for such devices as the keyboard and floppy disk drive. In each of these cases, it is basically necessary to convert or translate data into the form it would have if it had been generated or stored on the emulated device. The emulation of the display, however, is a special case, due to the problem of providing a display simultaneously having the characteristics of the target system display and the characteristics of the host system display. As with the more straightforward devices, it may be necessary to convert or translate the display update data from emulating processor 12, but it will also be necessary to integrate that data into a display with display data from host system 16.

Figure 6:
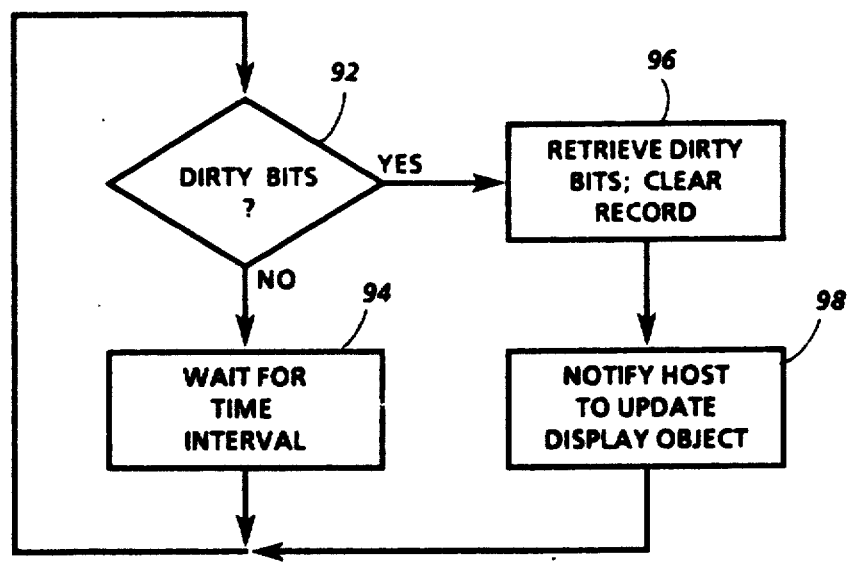
FIG. 6 is a flowchart showing a general technique for display emulation according to the invention.

FIG. 6 shows a technique according to the invention which solves this problem, enabling host system 16 to present a display characteristic of the host system which includes an emulated display characteristic of the target system based on data from emulating processor 12. This technique depends on information recorded in the step in box 74 in FIG. 4, in which a circuit in host system 16 records the region of the display which has been updated when emulating processor 12 writes data to its display bank in memory, which may be a character buffer or a bitmap memory. The technique of FIG. 6, however, is asynchronous with the step in box 74, even though it is performed by another part of host system 16.

In box 90, host system 16 determines whether any of the display regions have been updated based on the information recorded in box 74, if any. The record for each region may be a bit, referred to as a dirty bit, indicating when set that that region has been updated. If none of the dirty bits have been set, host system 16 waits for a time interval in box 94 before again performing the test in box 92. But if at least one dirty bit has been set, all of the dirty bits are retrieved and the record of dirty bits is cleared, in box 96. In box 98, another part of host system 16 is notified that the dirty bits have been retrieved, and proceeds to update a display object for the emulated display. In doing so, host system 16 will retrieve data from the emulating processor's display bank and will convert that data, if necessary, before loading it into the display object's data structure. The display object's data structure, however, is managed in much the same manner as other display object data structures in host system 16, so that even though its contents have the characteristics of a target system display, those contents appear within a display characteristic of the host system.

A display object data structure includes data which can be loaded into the host system bitmap memory by software running on the host system CPU, and which will then occupy only a part of the display, such as a window. The manner in which the data is loaded and the size and location of this window are determined by the software which loads the display object into the bitmap memory, preferably under control of the user. This elegant solution provides a display which can include both an emulated screen characteristic of the target system in a window and a background display including other windows and other display features characteristic of host system 16. This opens up the possibility of transferring data between the emulated screen and other windows under user control, a feature discussed in greater detail in coassigned U.S. patent application Ser. No. 856,525, now U.S. Pat. No. 4,899,136, incorporated herein by reference in its entirety.

The general features of the invention described above could be implemented in many ways with any of a multitude of different host systems emulating any of a multitude of target systems. The following detailed description shows more specifically how the Xerox 6085 system may be modified to emulate the IBM PC.

II. Host System Architecture

Figure 7:
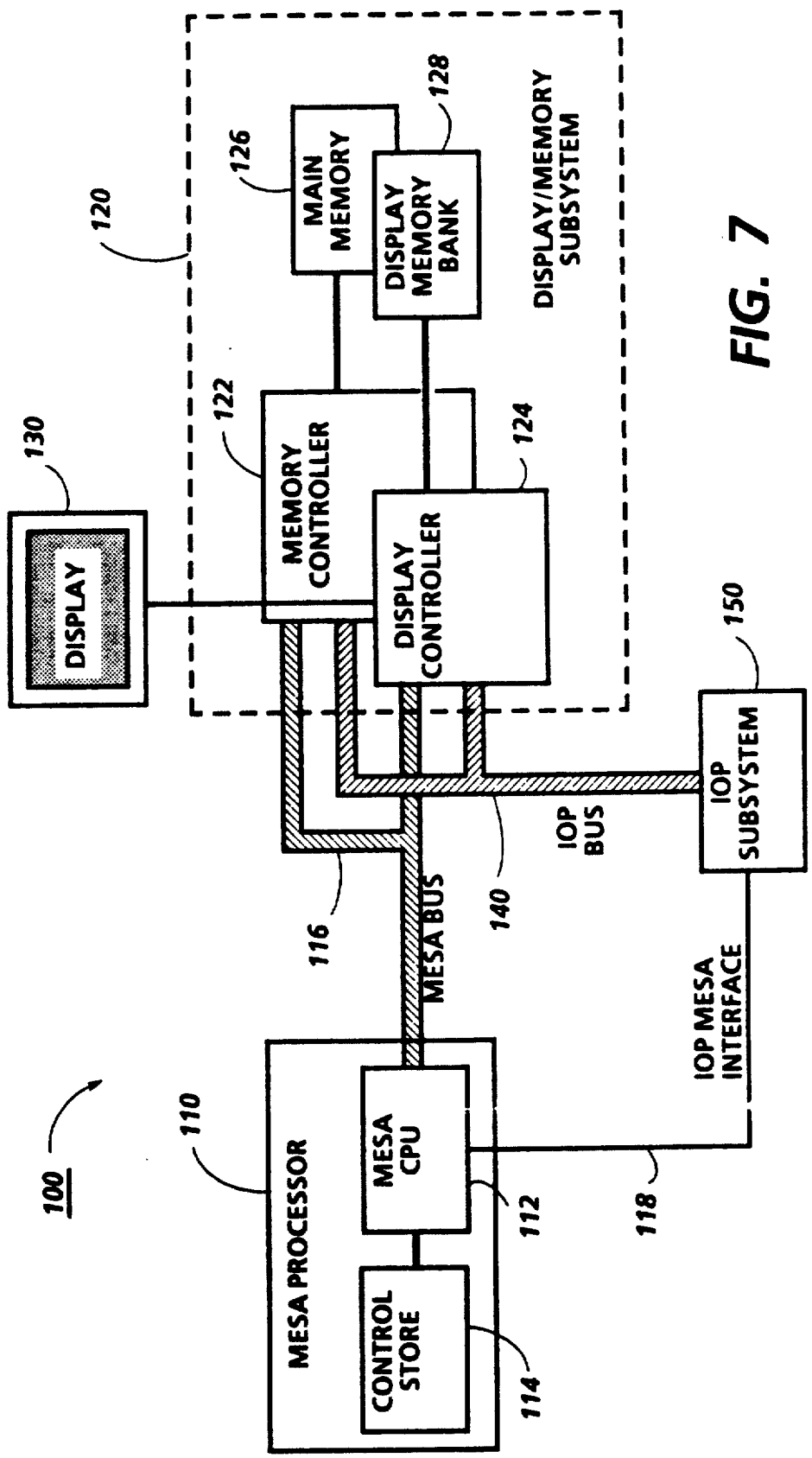
FIG. 7 is a block diagram showing a host system architecture like that of the Xerox 6085.

Implementation of the invention on a specific host system will depend heavily on that host system's architecture. Yet the invention could be implemented on any host system of suitable architecture and processing capabilities. The architecture of the host system must, of course, permit transfer of data as necessary between the emulating processor and the host system. FIG. 7 shows the major subsystems of a system 100 with an architecture like the Xerox 6085. The main processor in system 100 is the Mesa processor 110, including Mesa CPU 112 and its control store 114. The Mesa processor 110 may be implemented in a number of ways, but is currently implemented as discrete components on a printed circuit board which, when running a microcoded Mesa emulator stored in control store 114, provides the architecture defined in the *Mesa Processor Principles of Operation*, Version 4.0, (May 1985) Xerox Corporation. Mesa processor architecture is further discussed in Johnsson, R. K. and Wick, J. D., *An Overview of the Mesa Processor Architecture*, Proc. of the Symposium on Architectural Support for Programming Languages and Operating Systems, Palo Alto, March 1982, also appearing in SIGARCH Computer Architecture News 10(2) and SIGPLAN Notices 17(4). Any suitable processor of comparable power could be used in place of Mesa processor 110 in system 100, and it may be preferable to implement Mesa CPU 112 on a single VLSI chip. Mesa processor 110 is connected by Mesa bus 116 to display/memory subsystem 120 and by an input/output processor (IOP)-Mesa interface 118 to the IOP subsystem 150.

Display/memory subsystem 120 includes memory controller 122 and display controller 124, each of which is connected to Mesa processor 110 by Mesa bus 116 and also to IOP subsystem 150 by IOP bus 140. These controllers are also currently implemented as components on printed circuit boards, but they may also each be implemented as a VLSI chip, with compatibility obtained by using the same chip for both controllers or by other appropriate means. Memory controller 122 controls main memory 126, determining which of several components, including Mesa processor 110 and IOP subsystem 150, currently has access to main memory 126 and providing memory refresh as necessary. Display controller 124 similarly controls access to display bank 128, which contains the bitmap memory, and reads from it to provide information for display on display monitor 130.

The subsystems described above remain substantially the same with or without the emulation feature of the present invention. As discussed below, Mesa CPU 112 executes some additional software during emulation. Parts of main memory 126 are used to store information to emulate the main memory of the emulating processor 12 and to emulate the devices which provide the processor environment, and it is helpful to have two sets of mapping registers in memory controller 122, as discussed below. Otherwise, the changes which must be made in system 100 to perform emulation according to the invention are in IOP subsystem 150.

FIG. 8 shows system 100 again, but with IOP subsystem 150 shown in greater detail. IOP bus 140 is the main data path through IOP subsystem 150. The components connected to it include controllers for a number of I/O devices, including floppy disk controller 142, connected to floppy disk drive 152; Ethernet controller 144 connected to Ethernet 154; rigid disk controller 146, connected to rigid disk drive 156; serial controller 148a, connected to receive signals from keyboard 158, including mouse signals; and serial controller 148b, connected to an RS232C port. The processor responsible for servicing these controllers is the I/O processor (IOP) 160, which may be an Intel 80186 microprocessor, as discussed below. IOP 160 also has access to RAM 162 and EPROM 164, which are connected to IOP bus 140. A bus arbiter/mode control, discussed below, arbitrates bus control requests from Ethernet controller 144, rigid disk controller 146 and IOP 160.

Figure 8:
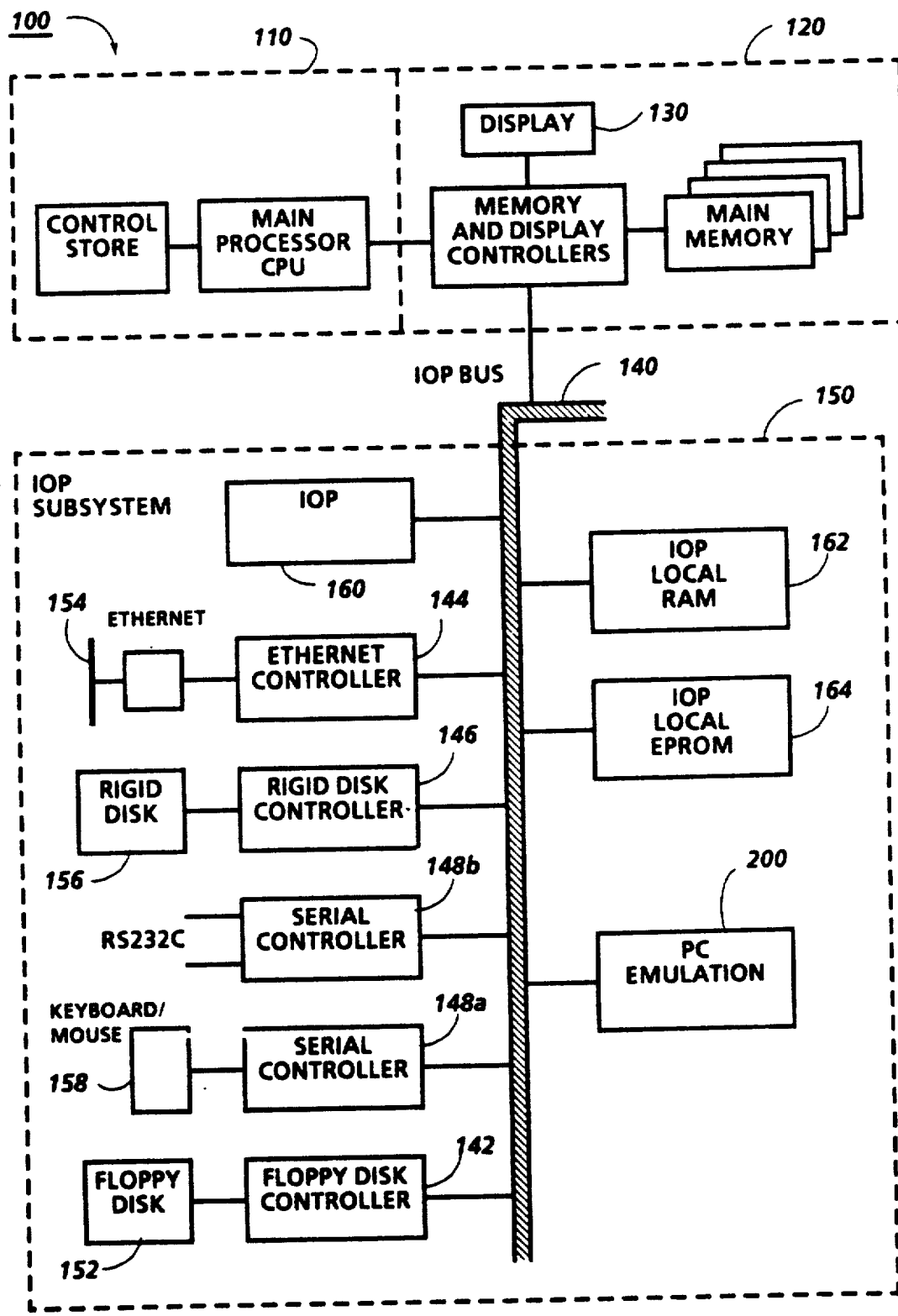
FIG. 8 is a block diagram showing in more detail the IOP subsystem of FIG. 7, including the PC emulation option according to the invention.

FIG. 8 shows PC Emulation (PCE) option 200 attached to IOP bus 140 in order to implement the present invention on system 100. PCE option 200 is preferably a discrete unit, such as a printed circuit board with attached components, so that it can be installed as an extension of IOP bus 140 without otherwise modifying the hardware of system 100. It may be necessary, however, that some components within IOP subsystem 150 and memory controller 122 be designed to accept PCE option 200. The emulating processor is within PCE 200, as discussed below.

Figure 10:
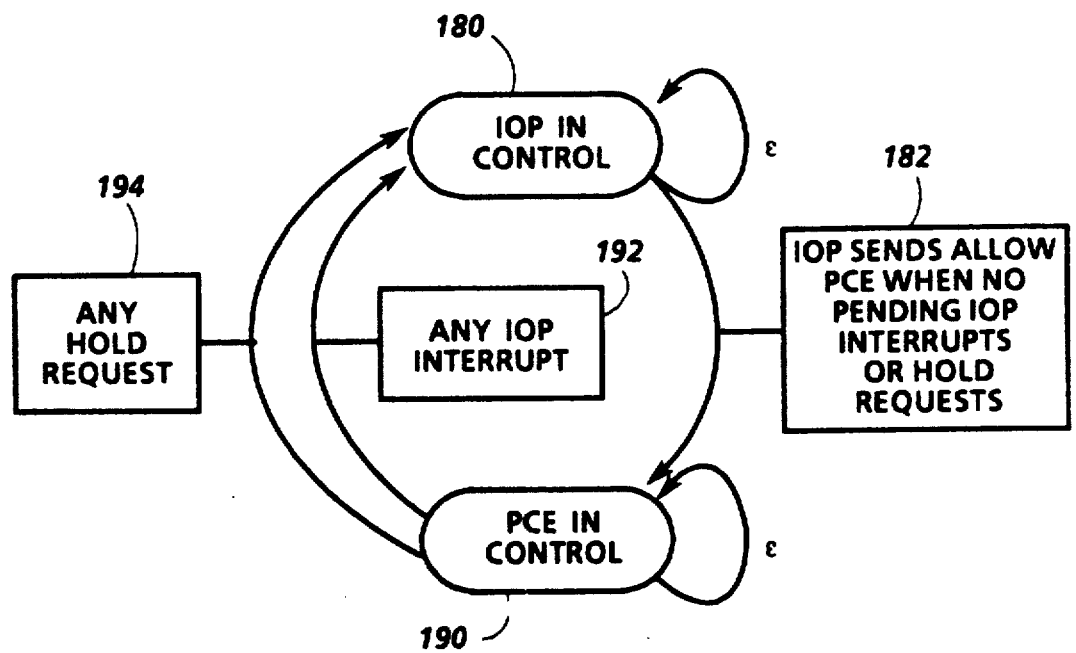
FIG. 10 is a state diagram of the mode control operation of bus arbiter/mode control of FIGS. 9A and 9B.
Figure 9A:
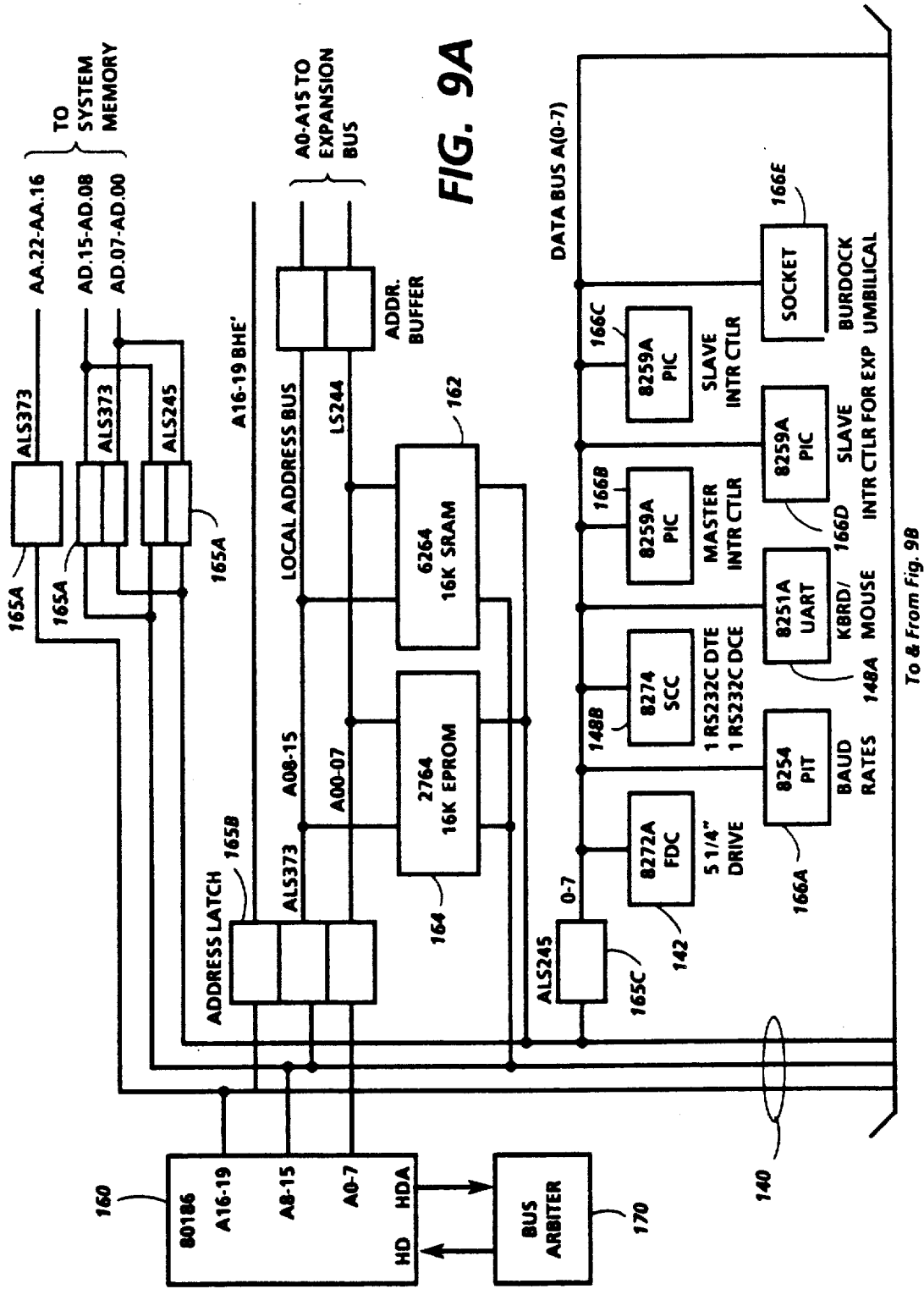
FIGS. 9A and 9B are a generalized circuit diagram showing in greater detail the components of the IOP subsystem of FIG. 8.
Figure 9B:
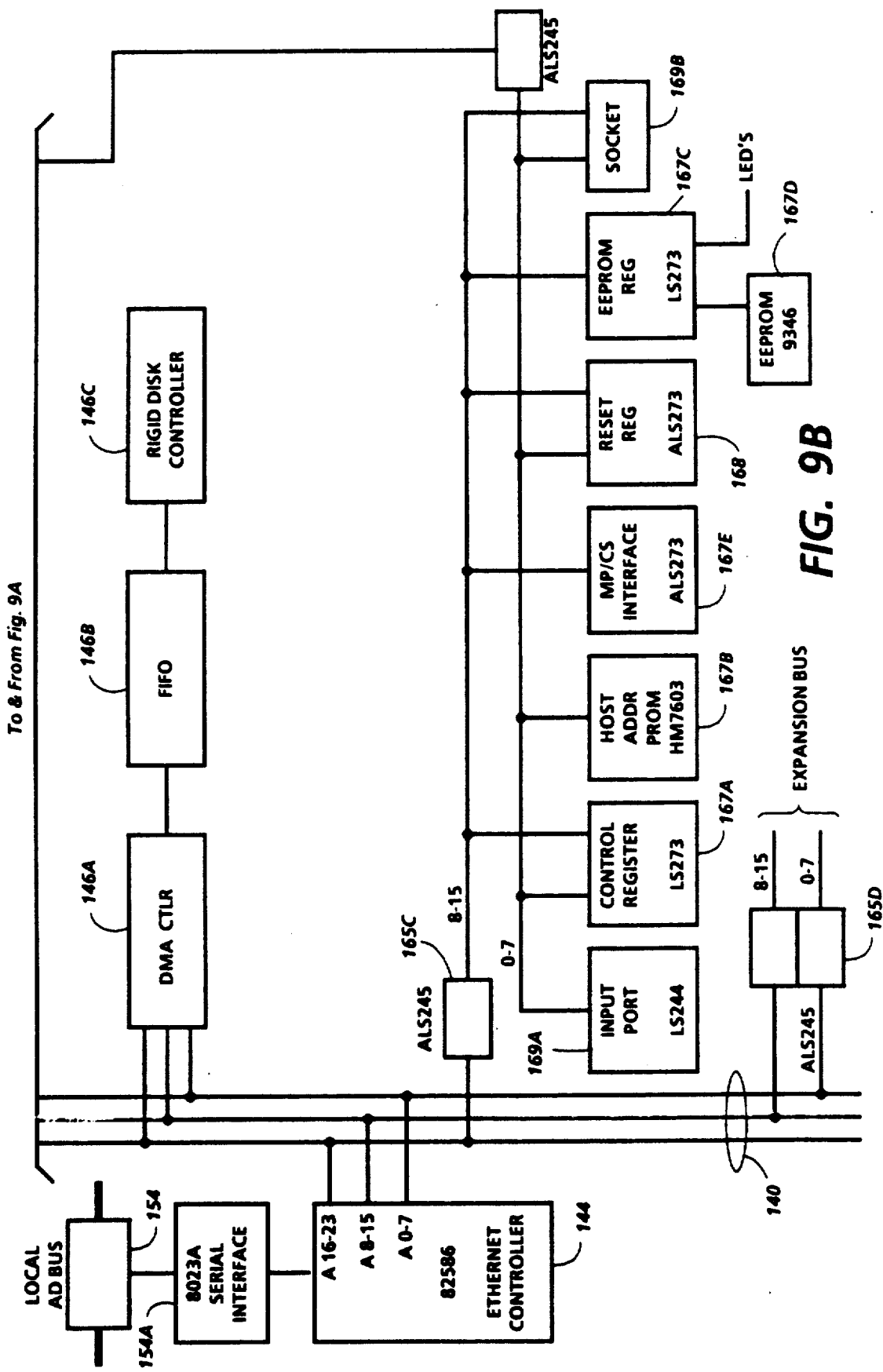

FIGS. 9A and 9B show the IOP bus structure of FIG. 8 in more detail, with many of the same components being shown with like reference numerals and with part numbers. Rigid disk controller 146 is connected to bus 140 through DMA controller 146a and FIFO buffer 146b. Ethernet controller 144 is connected to Ethernet 154 through serial interface 154a. FIG. 9A also shows bus arbiter/mode control 170 connected to IOP 160 so that arbiter/mode control 170 can send a hold request to IOP 160, which can reply with a hold acknowledge signal. FIG. 10, discussed below, provides more details about the mode control feature of arbiter/mode control 170.

FIGS. 9A and 9B show a number of additional connections to bus 140, generally involving buffers, drivers or latches, all of which are referred to below as connectors. Connectors 165a connect IOP bus 140 to the part of IOP bus 140 on the backplane, to which PCE option 200 is also connected. Connectors 165b connect to RAM 162 and EPROM 164, discussed above. Connectors 165c connect the data bus to a number of components, including floppy disk controller 142 and serial controllers 148a and 148b, discussed above, and additional components discussed below. Connectors 165d connect to an expansion bus for connecting additional options to the IOP bus 140.

The components connected through connectors 165c also include timer 166a, interrupt controllers 166b, 166c and 166d and socket 166e. Timer 166a provides timing signals to other components, such as serial controllers 148a and 148b. Master interrupt controller 166b receives interrupt request signals from a number of devices, several of which, including Mesa CPU 112, provide their requests through slave interrupt controller 166c, which may in turn receive interrupt requests from expansion bus devices through slave interrupt controller 166d. PCE 200 provides its interrupts directly to master controller 166b as the lowest priority interrupts. When no higher priority interrupts are present, master controller 166b will provide an interrupt request to IOP 160, also received by arbiter/mode control 170, and will also provide the starting address of the routine for servicing that interrupt. The routine for servicing a PCE interrupt is discussed below. Socket 166e provides a connection which can be used for debugging by connecting to another system.

Additional components connected through connectors 165c include control register 167a, host address PROM 167b, EEPROM register 167c, EEPROM 167d, MP/CS interface 167e, reset register 168, input port 169a and socket 169b. Control register 167a receives signals from IOP 160 and provides appropriate control signals to a number of I/O devices, including the speaker and floppy disk drive. Host address PROM 167b holds the unique Ethernet address of system 10, and can be accessed by IOP 160. EEPROM register 167c drives a number of LEDs and holds data used in writing EEPROM 167d at the time system 10 is installed. EEPROM 167d stores the configuration information for system 10 which is read at boot, and, for example, will contain data indicating whether PCE option 200 is included in system 10 or not. MP/CS interface 167e is a connector to the Mesa CPU 112 and its control store 114, a RAM, making it possible for IOP 160 to send and receive signals with CPU 112 and to write control store 114 in order to load it during boot of system 10. Reset register 168 receives signals from IOP 160 and provides appropriate reset signals to a number of devices, including PCE 200, Mesa CPU 112 and most of the I/O device controllers. Input port 169a is a port to a number of manual switches, permitting direct operator input for operation and testing of system 10. Socket 169b permits connection to bus 140 for debugging purposes.

Except as noted above, many of the components in FIGS. 9A and 9B do not relate directly to PCE 200. In addition to arbitrating requests from DMA controller 146a and Ethernet controller 144 for use of bus 140, however, arbiter/mode control 170 switches bus 140 between two modes, one in which IOP 160 has control and another in which a processor in PCE 200 has control. FIG. 10 shows a state diagram illustrating the mode control operation of arbiter/mode control 170. Circuitry to implement this state diagram could be implemented in many ways, including a circuit with discrete logic components or a dedicated VLSI chip.

In FIG. 10, IOP 160 has control of IOP bus 140 in state 180. This control is subject, however, to requests from DMA controller 146a and Ethernet controller 144 for use of bus 140, each of which may have priority over IOP 160. Such requests will therefore result in a hold request to IOP 160, and, when IOP 160 acknowledges the hold, the requesting controller will take control of the bus as needed. Upon completion of such operations, control will return to IOP 160, so that the mode control remains in box 180.

The only transition to another state from state 180 is transition 182, which occurs when IOP 160 sends a command to allow PCE 200 to have control of bus 140 at a time when no hold requests or interrupts to IOP 160 are pending. All other events follow the epsilon transition back to state 180, as shown. If IOP 160 sends the allow PCE command when an IOP interrupt or hold request is pending, this epsilon transition will be followed.

When transition 182 occurs, the mode control enters state 190, in which PCE 200 has control of bus 140. In this state, PCE 200 can access memory 126 through bus 140 and can proceed to execute a sequence of instructions until one of the transitions back to state 180 occurs. Transition 192 occurs whenever an interrupt is asserted to IOP 160, including an interrupt indicating that PCE 200 has requested an I/O operation. Similarly, transition 194 occurs whenever a hold request is made, such as on behalf of DMA controller 146a or Ethernet controller 144. PCE 200 does not originate hold requests. As long as neither an IOP interrupt nor a hold request occurs, all events will follow the epsilon transition back to state 190, and PCE 200 will retain control of bus 140.

In effect, IOP 160 invites PCE 200 to use bus 140 at appropriate times as determined by IOP software. If no IOP interrupts or hold requests are pending when the invitation occurs, PCE 200 then takes control of IOP bus 140 and continue to operate until IOP 160 or another device asserts control or until PCE 200 requires I/O operations to be performed by IOP 160. In addition to performing mode control according to FIG. 10, arbiter/mode control 170 contains circuitry which, when a hold signal is sent to PCE 200 to cause it to relinquish control of bus 140, prevents other circuitry from taking over bus 140 until PCE 200 acknowledges the hold. Arbiter/mode control 170 contains additional circuitry, not shown, which arbitrates between requests from rigid disk controller 146, Ethernet controller 144 and IOP 160 and which ensures that when an interrupt occurs, IOP 160 services it. The arbitration circuitry may treat a hold acknowledge from PCE 200 substantially the same as a hold acknowledge from IOP 160.

The software modifications which accompany the addition of PCE option 200 are discussed in greater detail below, but first we turn to a discussion of the architecture of PCE option 200.

III. PCE Board Structure

Figure 11:
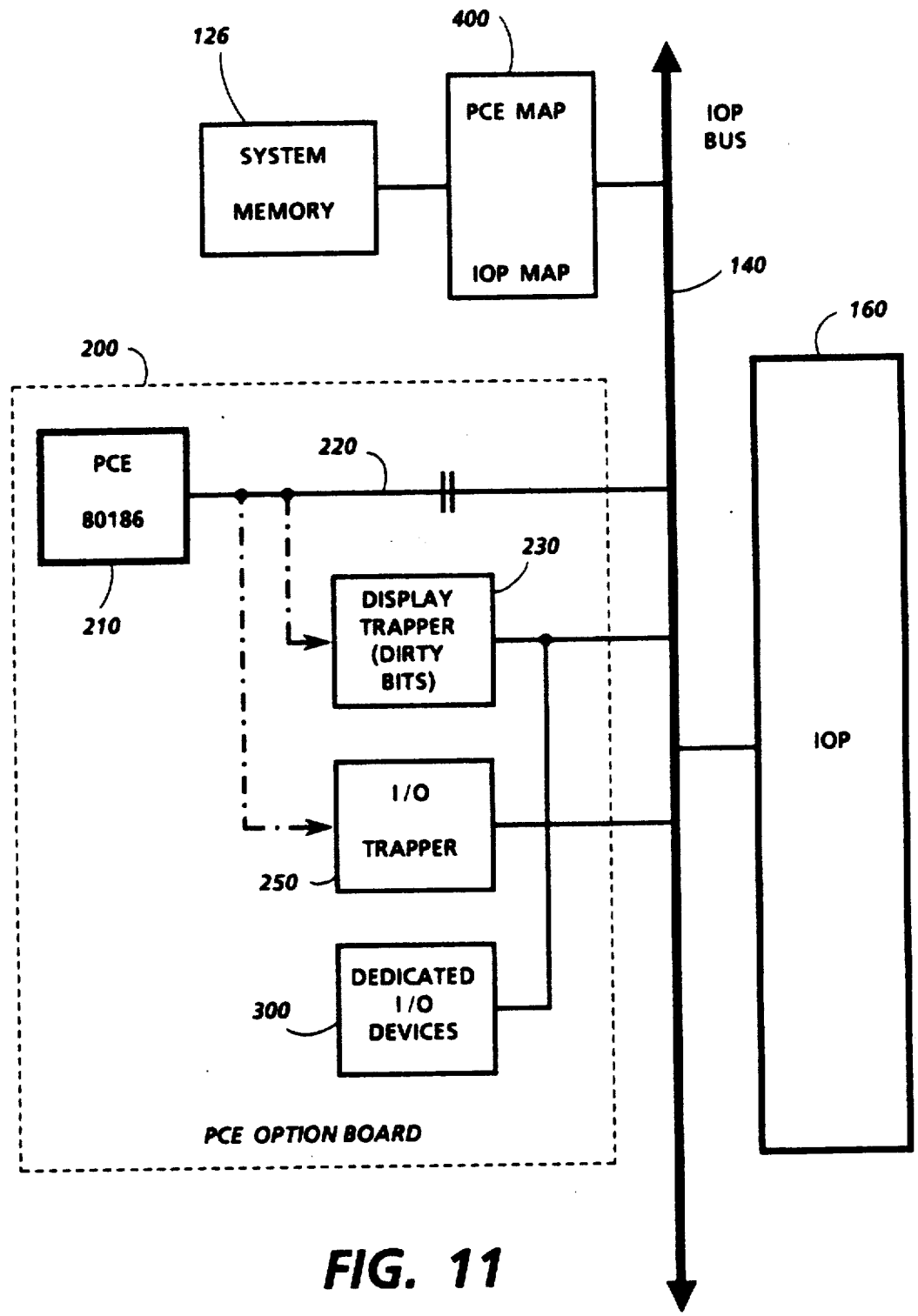
FIG. 11 is a block diagram of the components of the PC emulation option of FIG. 8.

PCE option 200 may conveniently be implemented as a separate board which may be added to system 10 by connecting it to IOP bus 140 on the backplane. FIG. 11 shows the major functional components of PCE option 200, including PCE CPU 210, an 80186 which operates as a coprocessor with IOP 160; PCE bus 220, which serves as the PCE board bus and which also serves as an extension of IOP bus 140 during memory transactions; display trapper 230; I/O trapper 250; and dedicated I/O devices 300.

FIG. 11 also shows how both IOP 160 and PCE CPU 210 are connected to system memory 126 through mapper 400, discussed below in relation to memory emulation. As will be seen, the mapper 400 connects each of the 80186 processors to its own respective section of memory based on the addresses provided by the respective processor. A set of mapping registers for each processor provides the high order bits for addressing that processor's section of memory.

Display trapper 230 and I/O trapper 250 monitor the operations of PCE CPU 210 for display updates and I/O operations, respectively. Upon detecting an I/O operation, I/O trapper stores or traps relevant PCE CPU 210 outputs and then signals IOP 160 with an interrupt. As discussed in greater detail below, IOP 160 takes control of IOP bus 140, retrieves the trapped data, and performs the appropriate operations to permit PCE CPU 210 to continue to execute a sequence of IBM PC instructions when it again has control of IOP bus 140. Display trapper 230, on the other hand, simply records the display regions which have been updated in the form of dirty bits, and IOP 160 asynchronously retrieves the dirty bits and requests a display update. Therefore display trapper 230 is substantially different than I/O trapper 250.

The circuitry in FIG. 11 is described in detail in copending U.S. patent application Ser. No. 856,526, now abandoned, incorporated herein by reference.

IV. Emulated Environment

The emulation of the environment of PCE CPU 210 requires the emulation of several distinct components which would be available to the CPU of an IBM PC, including memory and I/O devices. In most instances, host system 16 has an analogous component to the component being emulated, but the analogous component operates differently than the emulated component, so that PCE CPU 210 cannot simply treat the analogous component as if it were the emulated component.

A related problem in emulating the environment is that host system 16 cannot provide the responses of some of the emulated devices as quickly as the devices themselves could. In the particular architecture of the Xerox 6085, as described above, emulation by IOP 140 may not in fact be slower than the actual devices would be, but PCE CPU 210 will be stopped by IOP 140 during I/O device emulation, so that the responses are provided more slowly than by the actual devices. Therefore, PCE CPU 210 must be controlled so that it will continue to execute an instruction sequence properly even though some emulated devices in its environment respond more slowly than actual devices would respond.

In addition, during emulation, host system 16 may also emulate the user interface of the target system, in this case an IBM PC. This requires that host system 16 be capable of deriving the information necessary to emulate the user interface from PCE CPU 210.

In order to solve these problems, emulation according to the present invention may be implemented by combining two distinct techniques. The first technique is to emulate the memory of PCE CPU 210 in such a manner that it can execute memory read and write operations in the same number of instruction cycles as the IBM PC; execution of instructions requiring only memory read and write will proceed much as if PCE CPU 210 were in an IBM PC. The second technique is to emulate I/O devices with a separate processor, IOP 160, which controls PCE CPU 210 so that it continues to execute an instruction sequence properly, even though some of the instructions result in device emulation which responds more slowly than the corresponding actual devices in an IBM PC. If appropriate information is provided to host system 16 to enable it to emulate both the environment and the user interface of the target IBM PC, the two techniques can be combined to solve all of the problems set forth above.

Emulation of most of the devices which provide the processor environment differs from emulation of memory in that operation of PCE CPU 210 stops during emulation. While PCE CPU 210 is stopped, means within host system 16 performs the sequence of steps discussed above in relation to FIG. 5, emulating the appropriate I/O device. Then, when emulation is completed, PCE CPU 210 is permitted to resume operation.

Figure 12:
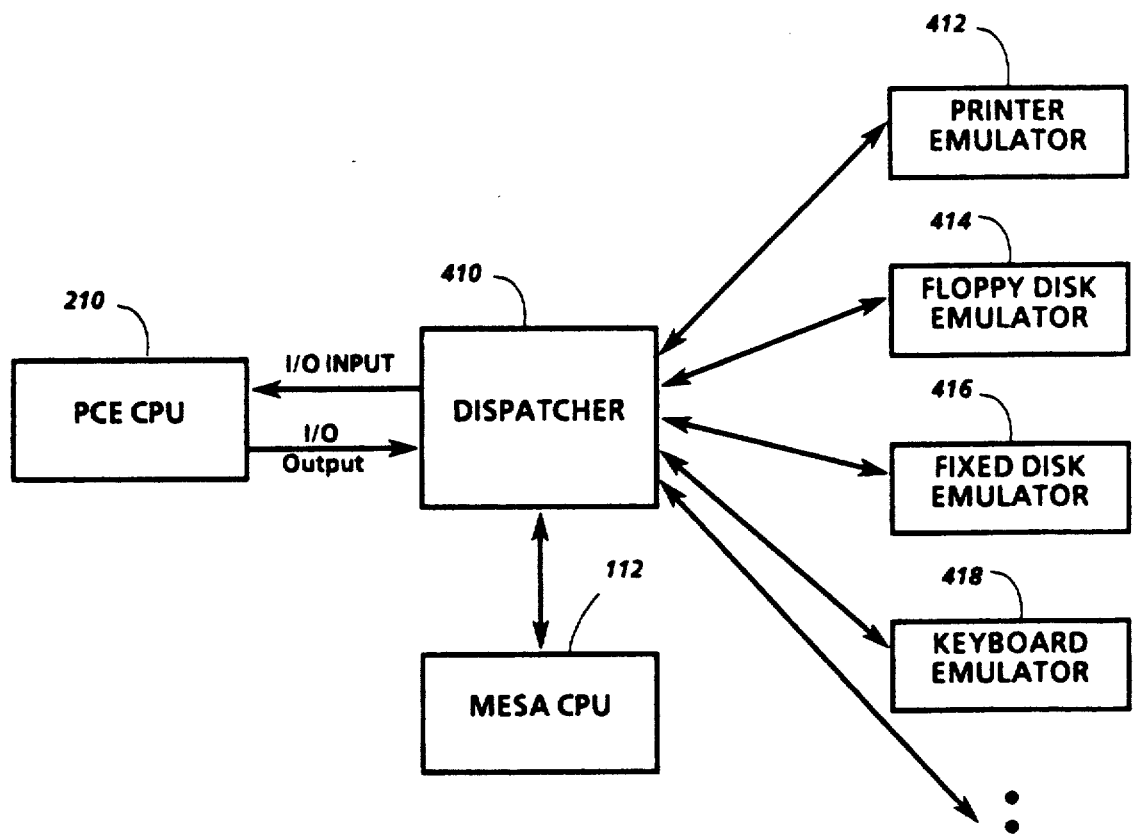
FIG. 12 is a block diagram showing the relationships between other components and the Dispatcher run on the IOP of FIG. 8 and which controls I/O device emulation.

The means for emulating the I/O devices includes IOP 160 as well as Mesa CPU 112. Although both processors participate, IOP 160 manages the emulation, primarily by executing software referred to as Dispatcher. FIG. 12 illustrates the relationships between Dispatcher 410 and other components. Dispatcher 410 handles communication between PCE CPU 210 and the various means which perform each of the specific I/O device emulations, examples of which include printer emulator 412, floppy disk emulator 414, fixed disk emulator 416 and keyboard emulator 418. In addition, Dispatcher 410 communicates with Mesa CPU 112. Dispatcher 410 therefore manages the performance of the steps shown in FIG. 5, with each of the device emulators being called when needed by Dispatcher 410.

1. Dispatcher. Because its task is to provide communication between a number of components, Dispatcher 410 could be implemented in many ways. An implementation which is especially appropriate for the host system architecture described above relies on a specialized operating system for IOP 160. That specialized operating system performs some basic Dispatcher functions, and also supports a multitasking queue which may hold tasks which perform other Dispatcher functions, some device emulator functions and a number of other functions.

a. IOP operating system. The operating system for IOP 160 could similarly be implemented in many ways, but, as noted above, can be a specialized operating system which performs only I/O operations. As a result, this operating system is more powerful than a general operating system which also performs other operations. The specialized operating system is possible because the architecture of host system 16 as shown in FIG. 8 permits true parallel operation, with Mesa CPU 112 performing other operations while IOP 160 performs I/O operations.

Figure 13:
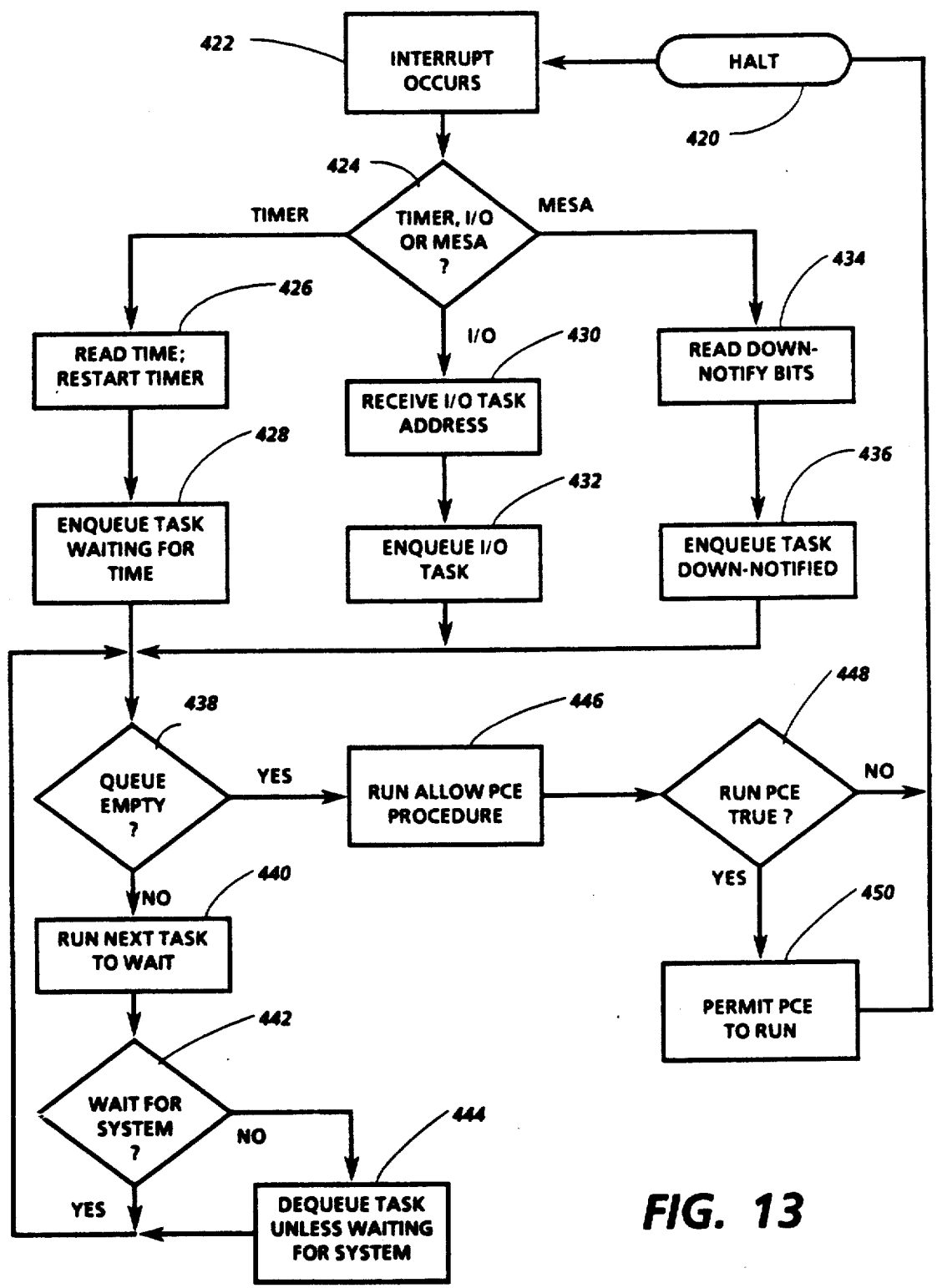
FIG. 13 is a flowchart showing relevant features of the operating system of the IOP of FIG. 8.

The relevant features of the specialized IOP operating system are shown in FIG. 13 which is a partial operating system flowchart. When IOP 160 is powered up, the operating system is automatically booted, and continues to run as long as IOP 160 operates, coming to rest in a halt state, as shown in box 420, during periods of inactivity. When an interrupt occurs, as in box 422, IOP 160 in effect wakes up, and a number of hardware functions are performed in the conventional manner for an Intel 80186 microprocessor. The hardware automatically stores the contents of certain registers and loads an address for servicing the interrupt. This address calls the specialized IOP operating system described above and it begins to execute.

The operating system first tests the type of interrupt, in box 424, with the three relevant types being an interrupt from the onboard timer of the 80186, an interrupt from the master interrupt controller 166b calling for an I/O operation, or an interrupt called a downnotify from the Mesa CPU 112. If the interrupt is from the timer, the IOP 160 reads its timer and restarts it, in box 426; then it adds to its multitasking queue any tasks which were waiting for the timer interrupt, in box 428. Similarly, if the interrupt is an I/O interrupt, IOP 160 receives the address from master interrupt controller 166b, in box 430, and adds the I/O task found at that address to the multitasking queue, in box 432. If the interrupt is from the Mesa CPU 112, IOP 160 reads a number of bytes from system memory 126 containing downnotify bits, in box 434, and enqueues the task indicated by the downnotify bits onto the multitasking queue in box 436.

The process described above in relation to boxes 422-436 occurs whenever IOP 160 receives an interrupt, whether or not it is in a halt state at the time. But if IOP 160 is executing another task when interrupted, the response to the interrupt in box 422 includes storing the necessary data to resume that task when the interrupting task has returned to a wait state. In effect, the IOP 160 maintains an additional interrupt queue of tasks which have been interrupted and are waiting to be completed, but this interrupt queue is managed by conventional Intel 80186 techniques, without the operating system. The multitasking queue maintained by the operating system, on the other hand, is in effect a linked list of data structures, each data structure containing the information necessary to execute a corresponding task. Tasks may be added to this multitasking queue during the steps shown in boxes 428, 432 and 436 or during other steps by the operating system.

IOP 160 next checks whether the multitasking queue is empty, in box 438. If not, the next task on the queue is run until it reaches a wait state, in box 440. If the wait state is a wait for system, as tested in box 442, the task is left in the queue, and IOP 160 again tests whether the multitasking queue is empty in box 438. If the wait state is not a wait for system, the task is first dequeued in box 444, and will remain dequeued until the operating system again enqueues it.

If the test in box 438 determines that the multitasking queue is empty, on the other hand, a special procedure called AllowPCE, which is part of Dispatcher 410, is run, in box 446. This procedure, therefore, is not strictly speaking a part of the operating system, but it is called by the operating system and is not an independent task like the Dispatcher tasks discussed below. AllowPCE tests whether a flag called RunPCE in system memory 126 is true, in box 448. This flag may be set either by Mesa CPU 112 or by IOP 160, and indicates whether PCE CPU 210 may be permitted to have control of IOP bus 140. If not, IOP 160 returns to its halt state in box 420. But if RunPCE is true, AllowPCE sends out signals which have the effect of permitting the PCE CPU 210 to run, because they release it from being held, and may lead to a change of state in accordance with FIG. 10, discussed above.

Figure 14:
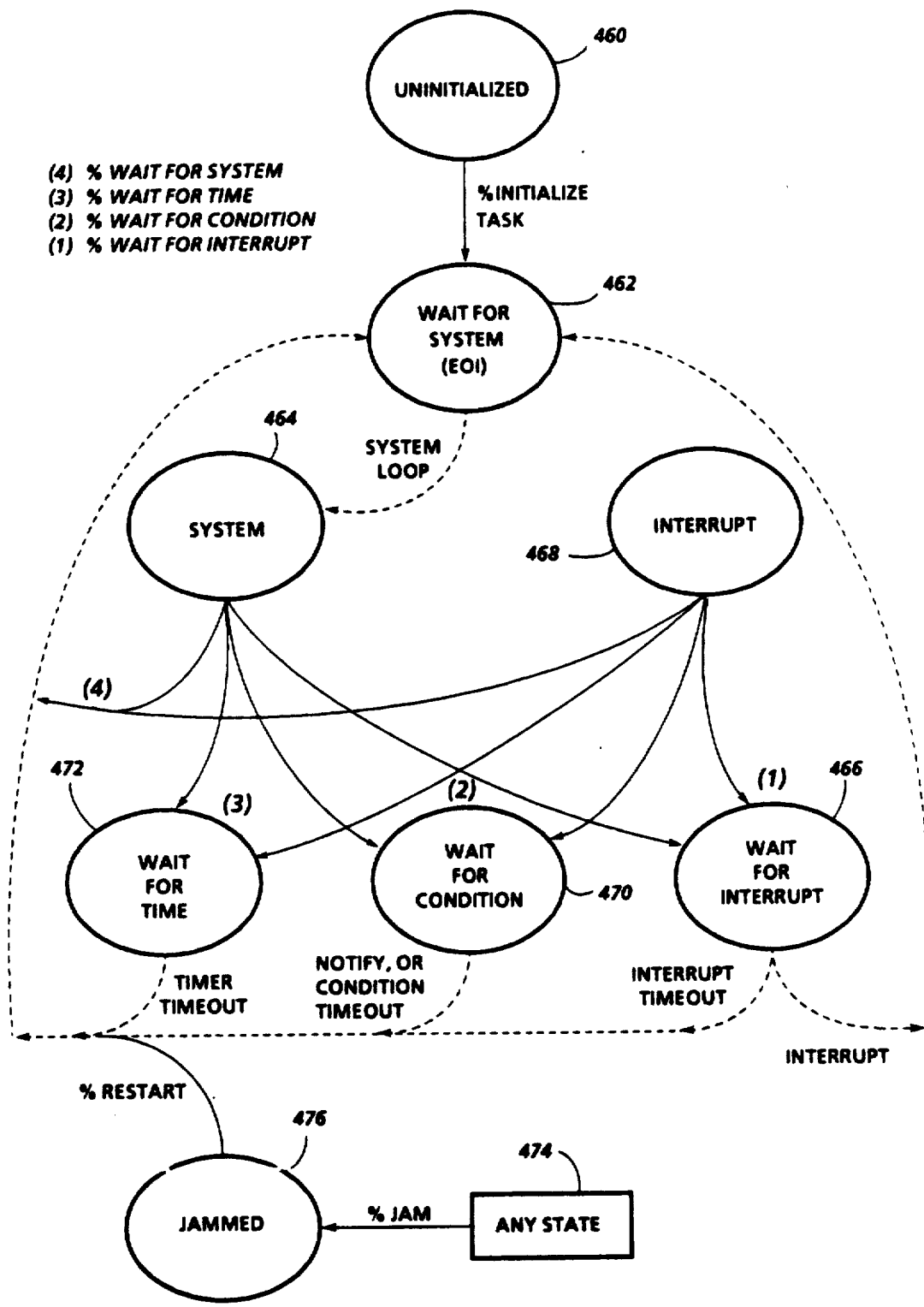
FIG. 14 is a state and transition diagram for a task managed by the operating system of FIG. 8.

FIG. 14 is a state and transition diagram followed by any task which may be on the multitasking queue managed by the operating system. The state of a task could be represented, for example, by a byte in the task data structure, the byte being changed to the value corresponding to a new state whenever the operating system or that task performs a routine corresponding to a transition from the previous state. Each task begins in uninitialized state 460, and leaves that state only when the operating system calls it and causes it to perform a routine called Initialize Task. Initialize Task prepares the task by initializing certain variables and taking other steps preparatory to running the task. When the task is ready to be run, it enters waitForSystem state 462, in which it is merely waiting for the operating system to place it on the multitasking queue to be run.

When the operating system reaches a task on the multitasking queue, it sends that task's priority to master interrupt controller 166b as a mask to prevent lower priority tasks from interrupting. Then the operating system, in box 440 of FIG. 13, gives system control of IOP 160 to that task, so that the task enters System state 464 in FIG. 14, and the task has exclusive use of IOP 160 until it enters one of its wait states. At that time, the task returns control of IOP 160 to the operating system, which goes through boxes 442 and 438 in FIG. 13 to find the next task waiting in the multitasking queue, and gives control to it.

A task may enter waitForInterrupt state 466 in which that task waits for one of the interrupts from master interrupt controller 166b. If so, the task also has an interrupt entry point, whose address is provided by interrupt controller 166b when it asserts the corresponding interrupt. That interrupt is only asserted, of course, if its priority is higher than the currently executing task and after all waiting higher priority interrupts have been asserted; interrupt controller 166b compares priorities to determine when to assert each interrupt. If any task is executing at the time an interrupt occurs, that task is pushed onto the interrupt queue, discussed above. Then the operating system begins servicing the interrupt, as described above in relation to box 422 in FIG. 13. Since the interrupt is an I/O interrupt, the operating system reaches box 432 in FIG. 13, and places the task waiting for the interrupt at the top of the queue. Then the operating system passes control of IOP 160 to the task in box 440 of FIG. 13, and the task runs in its Interrupt state 468 in FIG. 14 until it enters a wait state.

In addition to waitForInterrupt state 466, a task may enter other wait states, including waitForCondition state 470, waitForTime state 472 and waitForSystem state 462, described above.

If a task is in waitForCondition state 470, that task has identified a specific event, called a wait condition, the occurrence of which moves that task into waitForSystem state 462. The wait condition is fulfilled when another task provides a notification or notify specific to that wait condition. When the other executing task provides the notify, the operating system adds the task which was in waitForCondition state 470 to the multitasking queue after the other task has reached a wait state in box 440 in FIG. 13.

Similarly, if a task is in waitForTime state 472, that task has identified a period of time after which it is moved into waitForSystem state 462. Time periods are measured by the timer on IOP 160, which provides an interrupt at the end of a measured time period. Then, as described above in relation to box 426 in FIG. 13, IOP 160 reads the time and restarts the timer, and, in box 428, adds the task waiting for the time to the multitasking queue. As indicated in FIG. 14, waitForCondition state 470 and waitForInterrupt state 466 may also end after a period of time if the corresponding notify or interrupt is not received within that time, in which case a value indicating an error condition is stored and the task is placed on the multitasking queue at the end of the timeout to run again.

FIG. 14 also shows a state 474 which represents any state in which a task may be. From any state 474, a task may be moved to a jammed state 476 by the execution of its Jam procedure, after which its Restart procedure must be performed to place it back on the multitasking queue. The Restart procedure is similar to initializing, but some variables need not be initialized because they are already available. Jamming is useful when it is desired to hold a task off the queue for a period of time, and each task's Jam procedure goes through the multitasking queue, removing each occurrence of that task in the queue and changing its state to jammed state 476.

Figure 15:
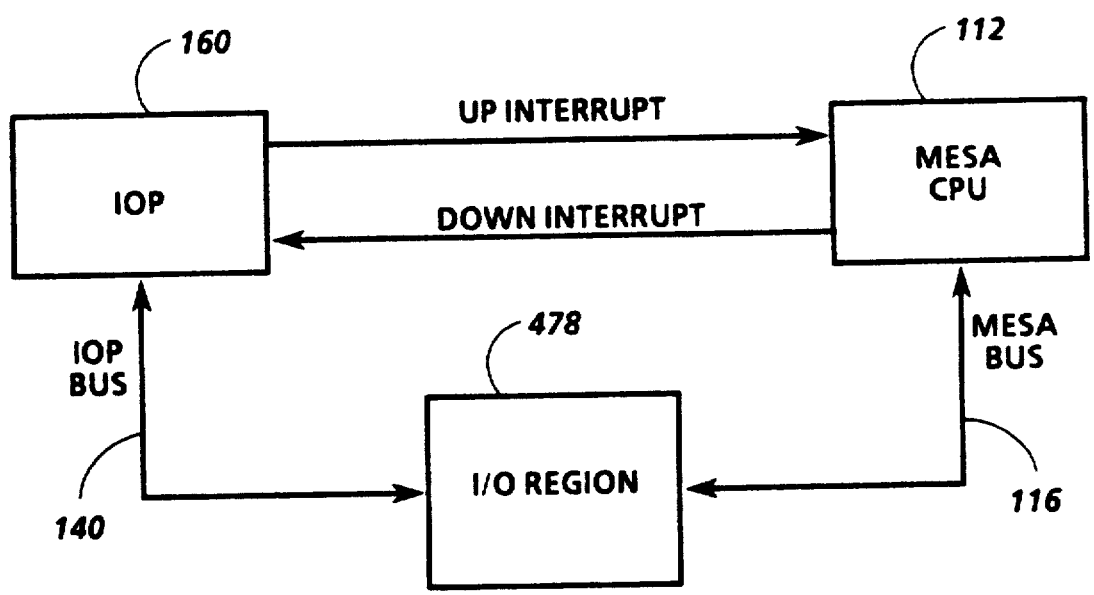
FIG. 15 is a block diagram showing communication between the IOP and Mesa CPU of FIG. 7.

FIG. 15 illustrates how downnotify, discussed above, occurs. As shown, Mesa CPU 112 has a direct down interrupt line for interrupting IOP 160. Prior to interrupting IOP 160, however, Mesa CPU 112 sets a bit in memory indicating which of a number of tasks is being downnotified. The downnotify bits or flags are in I/O region 478 in system memory 126, a region which Mesa CPU 112 and IOP 160 use to communicate to each other in relation to the I/O operations of PCE CPU 210. Therefore, IOP 160 may also use I/O region 478 to do an upnotify, in which case it sets an upnotify flag indicating which Mesa task is being upnotified and then signals Mesa CPU 112 on its direct up interrupt line.

Figure 16:
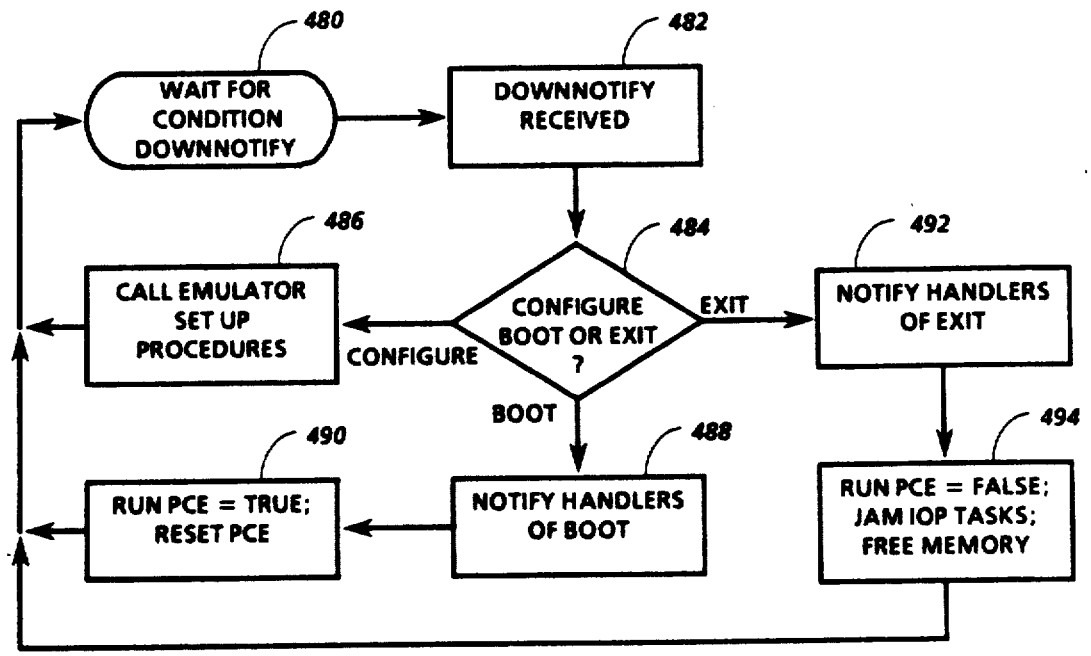
FIG. 16 is a flowchart showing the downnotify task of the Dispatcher of FIG. 12.

Many tasks may be managed by the operating system in the manner described above, including two tasks within Dispatcher 410. One of these tasks has a waitForCondition state 470 in which it waits for a downnotify from Mesa CPU 112, while the other has a waitForInterrupt state 466 in which it waits for an interrupt from PCE CPU 210, after which it enters Interrupt state 468.

b. Dispatcher downnotify task. FIG. 16 illustrates the Dispatcher downnotify task beginning in a waitForCondition state as in box 470 in FIG. 14, in which it awaits a downnotify from Mesa CPU 112. Mesa CPU 112 issues a downnotify to Dispatcher 410 when it receives a command from the user relative to configuration of, booting of or exiting from emulation, commands which the user may provide in the manner discussed in coassigned application Ser. No. 856,525, now U.S. Pat. No. 4,899,136, incorporated herein by reference. When a downnotify for Dispatcher 410 is received in box 482, the Dispatcher downnotify task determines which Dispatcher procedure the downnotify calls for--configure, boot or exit--in box 484. Mesa CPU 112 previously determines which procedure is appropriate based on user commands and stores a value in I/O region 478 indicating the appropriate procedure prior to providing the downnotify.

If the configure procedure is called for, the downnotify task calls the set up procedure for each of the emulator handlers, in box 486, there being one emulator handler for each of the I/O devices being emulated. The set up procedure of each emulator handler initializes any task which is part of that handler and otherwise prepares for emulation based on values stored in I/O region 478 indicating the configuration of the system to be emulated by PCE CPU 210. For example, if the user has selected a given number of floppy disk drives, the set up routine for the floppy emulator handler prepares to emulate that number of drives. The configure procedure also includes setting up the mapping of memory for PCE CPU 210, which is done by the memory emulator handler; it does so by programming the bank of registers used in PCE memory mapping, as discussed above, so that only those registers corresponding to the number of blocks of memory required have valid addresses, the other registers having a default value indicating an invalid memory access. After setting up the device emulator handlers, the configure procedure re-enters the waitForCondition state in box 480, from which it will again be roused by a Dispatcher downnotify from Mesa CPU 112.

If the boot procedure is called for, as determined in box 484, the downnotify task notifies the emulator handlers of the boot command from Mesa CPU 112, in box 488. Some emulator handlers which are waiting for this notify are put on the multitasking queue. Others simply store an indication that boot has occurred. The boot procedure also sets RunPCE in I/O region 478 to its true value, and resets PCE CPU 210 by applying a master reset signal, in box 490. Then the boot procedure reenters the waitForCondition state in box 480, awaiting a Dispatcher downnotify from Mesa CPU 112.

If the exit procedure is called for, as determined in box 484, the downnotify task notifies the emulator handlers of the exit command from Mesa CPU 112, in box 492. As with the boot command, the emulator handlers respond according to their own procedures. The exit procedure sets RunPCE false, starts the Jam procedure of all of the tasks relating to operation of PCE CPU 210, and frees the memory space allocated to PCE memory, in box 494. The exit procedure then reenters the waitForCondition state in box 480, awaiting a Dispatcher downnotify.

Figure 17:
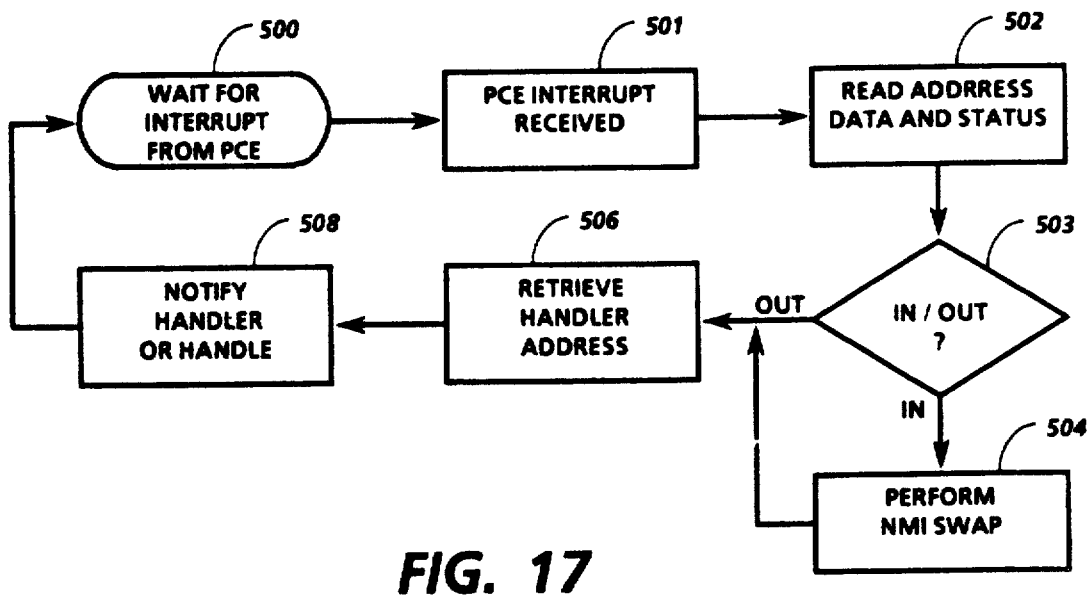
FIG. 17 is a flowchart showing the interrupt task of the Dispather 12.

The Dispatcher downnotify task in FIG. 16 handles the starting and stopping of PCE CPU 210 with its configure, boot and exit procedures. During operation of PCE CPU 210, however, the Dispatcher interrupt task assists in the emulation of its I/O environment.

c. Dispatcher interrupt task. FIG. 17 illustrates the Dispatcher interrupt task which responds when PCE CPU 210 requests an I/O operation. As discussed above, I/O trapper 250 sends an interrupt to master interrupt controller 166b. If no interrupt of higher priority is awaiting servicing, interrupt controller 166b sends an interrupt to IOP 160, and provides the address of the routine for handling that interrupt, in this case an address within the interrupt task of Dispatcher 410. At this point, the interrupt task will execute from its Interrupt state 468 in FIG. 14, following the sequence shown in FIG. 17.

The interrupt task begins in its waitForInterrupt state, awaiting an interrupt from I/O trapper 250 indicating that PCE 210 has requested an I/O operation, in box 500. When an interrupt is received, in box 501, the interrupt task reads and stores the address, data and status bytes stored by I/O trapper 250, in the manner discussed in copending U.S. patent application Ser. No. 856,526, now abandoned, incorporated herein by reference, in box 502.

The status byte may be tested in box 503 to determine whether the requested I/O operation is an input (IN) or an output (OUT) operation. If an IN operation, the interrupt task may perform an NMI swap in box 504. This step may be necessary if the sequence of instructions being executed by PCE CPU 210 includes NMI operations other than an NMI correction routine discussed below as a technique for providing inputs to the PCE CPU 210 in response to an I/O IN request. The NMI swap, if used, changes an address in PCE memory at which PCE CPU 210 will find its routine for servicing the NMI interrupt. The address is changed from whatever it was prior to the NMI swap to the location of the NMI correction routine, so that when PCE CPU 210 again starts to execute, it will begin with the NMI correction routine. The previous address is stored, however, during the swap, and may then be restored to provide the other NMI operations from I/O trapper 250. The NMI correction routine is a part of Dispatcher 410 which causes PCE CPU 210 to retrieve a value stored in PCE memory by the emulator handler and to treat that value as if it were an input, as discussed in more detail in relation to FIG. 19 below.

In box 506, the interrupt task uses the address from I/O trapper 250 to access a jump table in which is stored the address of the emulator handler routine corresponding to each valid address from I/O trapper 250. If the address is below 400 H, it may refer to one of the I/O devices found in an IBM PC which is present in the configuration of PCE CPU 210; if so, the interrupt routine calls the emulator handler for that device, but if not, the interrupt routine treats the I/O request as a no op. If the address is above FF00 H, it would relate to the internal register map of the PCE CPU 210, a feature not present on the CPU of an IBM PC, so that an error is generated. If the address is between 400 h and FF00 h, it is a non-supported value, and the I/O request is treated as a no op.

If the address of an emulator handler is retrieved from the jump table in box 506, the interrupt task proceeds to notify a task at that address within the handler or to handle the emulation itself by calling a procedure from that handler, in box 508. The emulator handlers, both those which have independent tasks and those which are called within Dispatcher 410, are described below.

When the interrupt task completes the handling of the I/O request in box 508, it returns to its waitForInterrupt state in box 500. When another I/O request is received from PCE CPU 210, the interrupt routine will again follow the sequence shown in FIG. 17.

2. Emulation—general features. The brief descriptions above of how the dispatcher handler emulates some I/O devices suggests that the I/O device emulator handlers share certain general features. Those general features correspond to the functions performed in box 84 in FIG. 5, described above.

Figure 18:
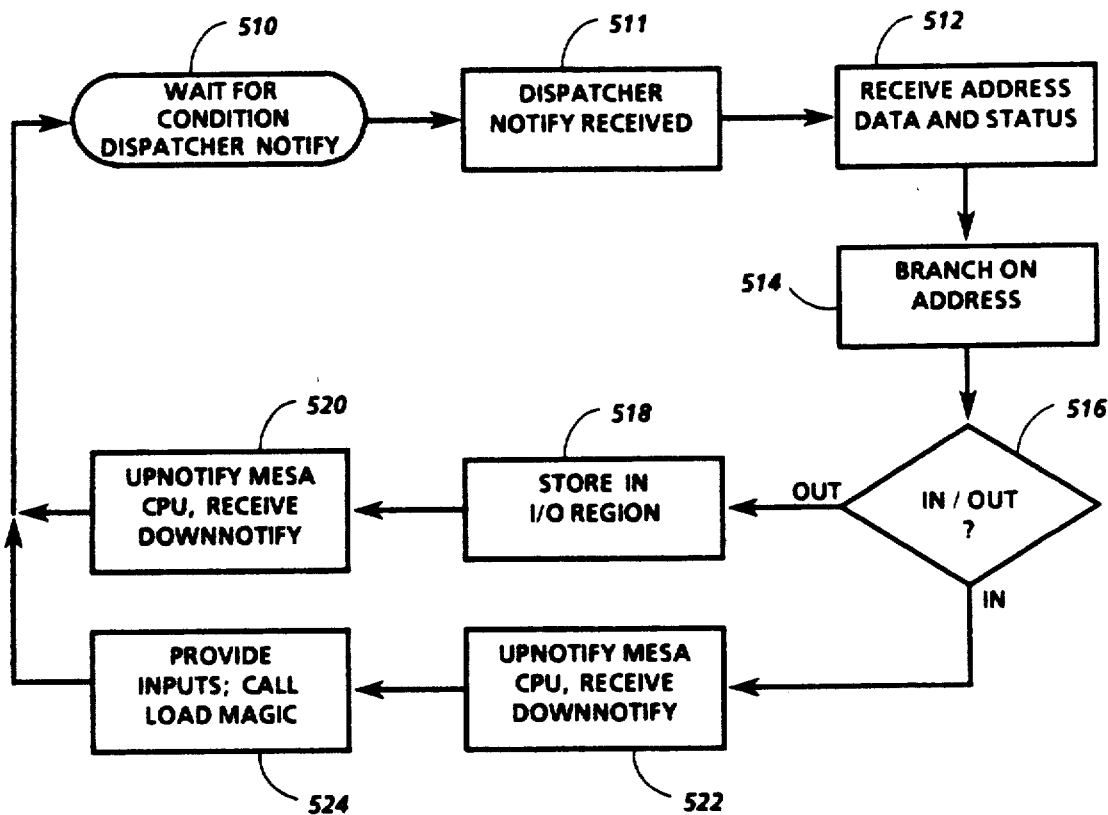
FIG. 18 is a flowchart showing steps which typify the I/O device emulators of FIG. 12.

FIG. 18 illustrates general features which typify the remaining device emulator handlers according to the invention. The emulation of memory and part of the display emulator, however, are somewhat different, as discussed above in relation to FIGS. 4 and 6, respectively. Those emulations do not, strictly speaking, emulate I/O devices, but rather emulate main memory itself and features of the IBM PC display which result from the reading of the main memory's display buffer directly by the display controller.

The features shown in FIG. 18 are ordinarily implemented as part of a task which may be on the multitasking queue of IOP 160. This task, generally referred to as a handler task or a handler, will begin, in box 510 in a waitForCondition state, awaiting a notify from Dispatcher 410. Upon receiving a notify, in box 511, the handler task is placed on the multitasking queue and executes as shown in the remainder of FIG. 18.

The handler task begins by receiving the address, data and status, if relevant, from Dispatcher 410, in box 512. These values will typically have been stored in I/O region 478 by Dispatcher 410. For some handler tasks, the address may take any of several values, depending on the operation requested by PCE CPU 210. Therefore, those handler tasks will branch to an appropriate subroutine based on the address, in box 514. The status is then typically tested in box 516 to determine whether an IN or an OUT operation is requested.

If an OUT operation is requested, the task handler will typically store any appropriate information derived from that provided by PCE CPU 210 in a corresponding location in I/O region 478, in box 518. If servicing by an actual I/O device is required or if the OUT operation requested has any other implications for the operation of host system 16, an upnotify may be issued to Mesa CPU 112 and the handler task may wait for a downnotify from Mesa CPU 112, in box 520. Upon completing any processing pursuant to the downnotify, the handler task reenters its waitForCondition state in box 510.

If an IN operation is requested, the task handler may similarly upnotify Mesa CPU 112, in box 522, commonly to obtain information to be input to PCE CPU 210. Then, the input information is provided and the procedure LoadMagic is called to store that information in a special data structure in PCE memory which serves as a communication link between IOP 160 and PCE CPU 210. That data structure, called MagicDataStructure, includes a flag indicating whether it contains a word or a byte; the word or byte itself, MagicWord or MagicByte; and a value called OldNMIVector which may serve as the location of the NMI servicing routine which PCE CPU 210 would have executed if it had received an NMI other than as the result of an IN I/O operation request, as discussed above in relation to box 504 in FIG. 17. LoadMagic loads the MagicWord or MagicByte into MagicDataStructure, if necessary moves the value which the PCE CPU 210 would have accessed as the NMI vector into OldNMIVector, and, again if necessary, places the location of an NMI correction routine into the NMI vector location, in box 524. Then the handler task reenters its waitForCondition state in box 510.

Although not all the handler tasks include all the steps in FIG. 18, most follow a similar set of steps in responding to an I/O request. Even the more complex handler tasks, despite their complexity, include some of these general features.

Figure 19:
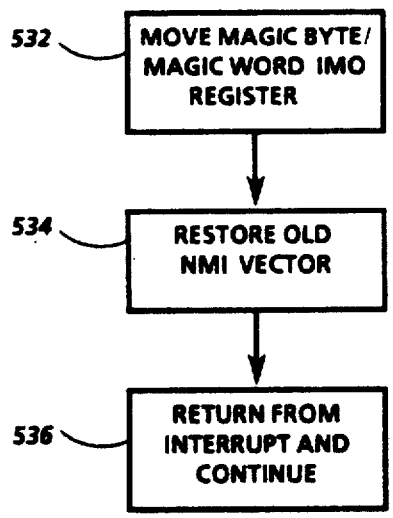
FIG. 19 is a flowchart showing the NMI correction routine by which the PCE CPU of FIG. 11 receives information from one of the device emulators.

FIG. 19 shows the NMI correction routine, discussed above in relation to Dispatcher 410, which PCE CPU 210 executes in order to receive the information in MagicDataStructure. This routine will be executed by PCE CPU 210 when it is permitted to run at a time when its NMI line has received a high signal. The NMI correction routine begins in box 532 by moving the MagicByte or MagicWord into the appropriate register (AX or AL) in PCE CPU 210 as if it had been received as input from an I/O device. If necessary, the value stored as OldNMIVector may then be returned so that PCE CPU 210 would retrieve it as the NMI vector, in box 534. PCE CPU 210 then returns from servicing the NMI interrupt and continues to execute a sequence of instructions, in box 536.

The sequence of FIG. 19 provides a solution to the problem of how to provide input information when PCE CPU 210 provides an I/O IN request. One technique would be to interrupt the currently executing instruction at the time it provides the I/O IN request, providing the appropriate input on the data bus before permitting it to continue. Another technique would be to use some sort of memory device to store the appropriate input data obtained previously by using IOP 160 to work ahead, so that when PCE CPU 210 provided an I/O IN request, the input data would be provided immediately without stopping PCE CPU 210. The technique of which the routine of FIG. 19 is a part, however, permits PCE CPU 210 to execute the instruction to completion, reading erroneous data from its data bus into its AX or AL register. Then, at the completion of the instruction, PCE CPU 210 is stopped and while it is inactive, the correct data is loaded by LoadMagic into MagicDataStructure. Then, when PCE CPU resumes, its first act is to load the data in MagicDataStructure into its AX or AL register, correcting the erroneous data stored there, after which it continues the sequence of instructions it had been executing.

3. DMA emulator. The direct memory access (DMA) emulator handler emulates the DMA controller in an IBM PC. The DMA controller in an IBM PC works with the floppy and hard disk controllers during transfer of data between memory and a floppy disk or the hard disk. Four channels in the DMA controller may each be dedicated for a specific use, and the DMA controller receives signals from the CPU specifying the channel, specifying the address and byte count of a data transfer to be performed on that channel and specifying the mode in which the DMA controller performs the transfer. Emulation of the DMA controller is necessary in order to obtain some of these signals from PCE CPU 210, but since the DMA controller does not ordinarily provide any inputs to the CPU, only the output I/O request are emulated.

Because of the simplicity of DMA emulation, it is handled somewhat differently than the other emulators discussed below. Rather than providing an emulator handler task, the DMA emulator handler provides procedures which can be called by Dispatcher 410 when it determines that the address from PCE CPU 210 requests a DMA operation. These procedures store data sent with OUT request in one of three arrays in I/O region 478. The array pceDMAData stores data specifying the address and byte count of a data transfer; the array pceDMAControl stores DMA mode control data; and the array pceDMAPages stores the four high bits of a 20 bit address. The data stored in these arrays can then be accessed by other emulators. The pceDMAToggle, a flag in I/O region 478, may also be set by these procedures.

Since the DMA emulator handler procedures are called directly by Dispatcher 410, they are executed within its interrupt task, in box 508 of FIG. 17, discussed above. If the address from PCE CPU 210 requests an I/O operation transferring data specifying an address or byte count or the mode of a transfer, Dispatcher 410 calls a procedure DMAController, illustrated in FIG. 20. If the address requests an I/O operation specifying the four high address bits, Dispatcher 410 calls a procedure DMAPages, illustrated in FIG. 21.

Figure 20:
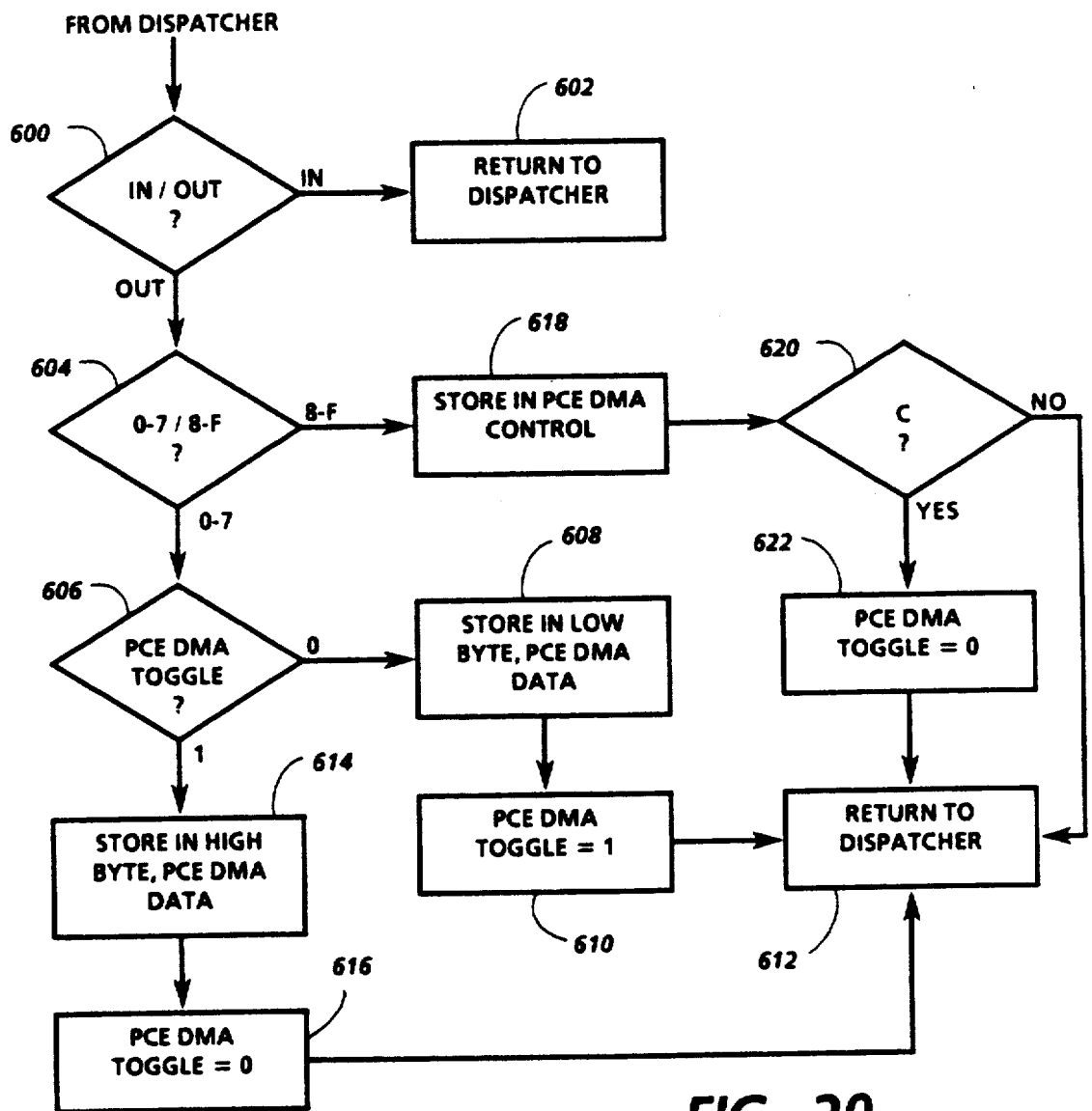
FIG. 20 is a flowchart of a procedure DMAController within the DMA emulator.

DMAController, as shown in FIG. 20, begins with a test of the status bits from PCE CPU 210 to determine whether an IN or OUT operation is requested, in box 600. If IN, control is returned to Dispatcher 410 in box 602, so that the request is treated as a no op, because the DMA emulator handler does not provide any input signals to PCE CPU 210. The DMA controller chip used in an IBM PC could provide such signals and such signals could be emulated, but the software written for the IBM PC does not, as a practical matter, read such signals from the DMA controller, so that PCE CPU 210 can execute sequences of instructions written for the IBM PC without receiving any such input signals.

DMAController continues, if an OUT request was received, by testing the address in box 604 to determine whether it is in the range 00–07h or in the range 08–0Fh. If 00–07h, the value to be stored will be received with two requests, each providing one byte, the low byte being provided first.

Therefore, the test in box 606 determines whether the byte being received is the high byte by testing the flag pceDMAToggle which will have been set to 1 if a low byte has been previously received. If 1 pceDMAToggle is 0, the byte received is stored in the array pceDMAData as the low byte at a location corresponding to the address received, in box 608. Then, pceDMAToggle is set to 1 in box 610, and control is returned to Dispatcher 410 in box 612. If pceDMAToggle is 1, the low byte has already been received, so that the byte received is stored in the array of pceDMAData as the high byte adjacent to the previously stored low byte, in box 614. Then pceDMAToggle is set to 0 in box 616 in readiness for the next low byte before control is returned to Dispatcher 410 in box 612.

If the test in box 604 determines that the address is in the range 08-0Fh, the received byte is stored in the array pceDMAControl at a location corresponding to the address received, in box 618. Then, in box 620, the address is tested to determine whether it is 0Ch, indicating that pceDMAToggle should be reset. If so, pceDMAToggle is set to 0 in box 622 before returning control to Dispatcher 410 in box 612.

Figure 21:
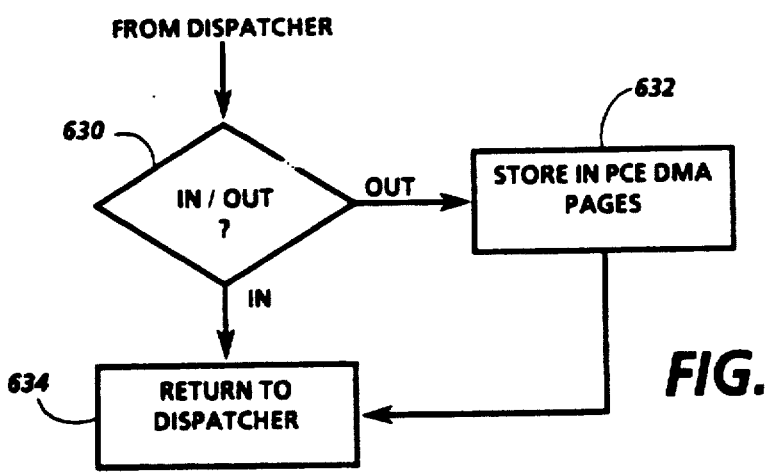
FIG. 21 is a flowchart of a procedure DMAPages within the DMA emulator.

DMAPages, shown in FIG. 21, tests the status received from PCE CPU 210 to determine whether an IN or OUT operation is requested, in box 630. If OUT, the data received is stored in the array pceDMAPages at a location corresponding to the address received, in box 632, before returning control to Dispatcher 410 in box 634.

As noted above, the DMA emulator handler does not provide any input signals to PCE CPU 210, because IBM PC software does not make use of that capability of the DMA controller chip, so that there is no need to attempt to emulate it. In addition, the DMA controller chip operates in several available transfer modes. The choice of modes is not relevant for the emulator, since IOP 160 is multitasked, making real time operation impossible. Therefore, the DMA emulator handler also does not provide more than one transfer mode, and the bits indicating transfer mode, although stored, are not used.

Although the DMA emulator handler is simple, it is necessary for emulation of the floppy disk drive, which is somewhat more complicated.

4. Floppy disk drive emulator. In addition to emulating the operation of the floppy disk controller (FDC) in the IBM PC so that the PCE CPU 210 can continue to execute instructions, the floppy disk emulator also helps to emulate the user interface of an IBM PC by enabling the user to treat the floppy disk drive of host system 16 as if it were the floppy disk drive of an IBM PC. The floppy disk emulator also enables the user to transfer data between host system 16 and PCE CPU 210 using a novel data structure referred to as a virtual floppy. These latter features are discussed in additional detail in coassigned application Ser. No. 856,525, now U.S. Pat. No. 4,899,136, incorporated herein by reference in its entirety.

The CPU of an IBM PC operates its FDC by sending a sequence of IN and OUT I/O requests to the FDC which specify a floppy operation; waiting while the FDC performs the specified floppy operation; and receiving the results of the floppy operation using another sequence of IN and OUT I/O requests. The CPU may send I/O requests to the FDC using three addresses, 3F2h, 3F4h and 3F5h. 3F2h is used for an OUT request to load the digital output register (DOR), a hardware register in the IBM PC controlling the switching of the floppy drive motors on and certain other operations. 3F4h is used for an IN request for the contents of the FDC main status register. 3F5h is used for an IN or OUT request to receive from or send to the data register of the FDC. Typically, the CPU will send a 3F2h OUT request to start the appropriate motor, followed by a 3F4h IN request to check FDC status and a 3F5h OUT request to send a command. Then the necessary parameters for the performance of the command are provided by alternately checking the status and sending a parameter, until all the parameters necessary are sent. After the command is performed, the CPU will similarly alternate status checks with the reading of a result until all results are received.

In emulating the FDC, the floppy emulator handler receives a command and the parameters necessary to perform it from PCE CPU 210 and stores them in a block called an IOCB in I/O region 478. When the IOCB is complete, the floppy emulator handler tests whether the floppy disk to be accessed is a physical floppy in the physical floppy disk drive of host system 16 or is a virtual floppy in the hard disk of host system 16. If a physical floppy is to be accessed, the IOCB is enqueued for processing by a floppy handler task on IOP 160. If a virtual floppy is to be accessed, an up-notify is sent to Mesa CPU 112 for processing of the IOCB. In either case, upon completion, the floppy emulator handler receives a notify, and provides any results it receives to PCE CPU 210.

Figure 22:
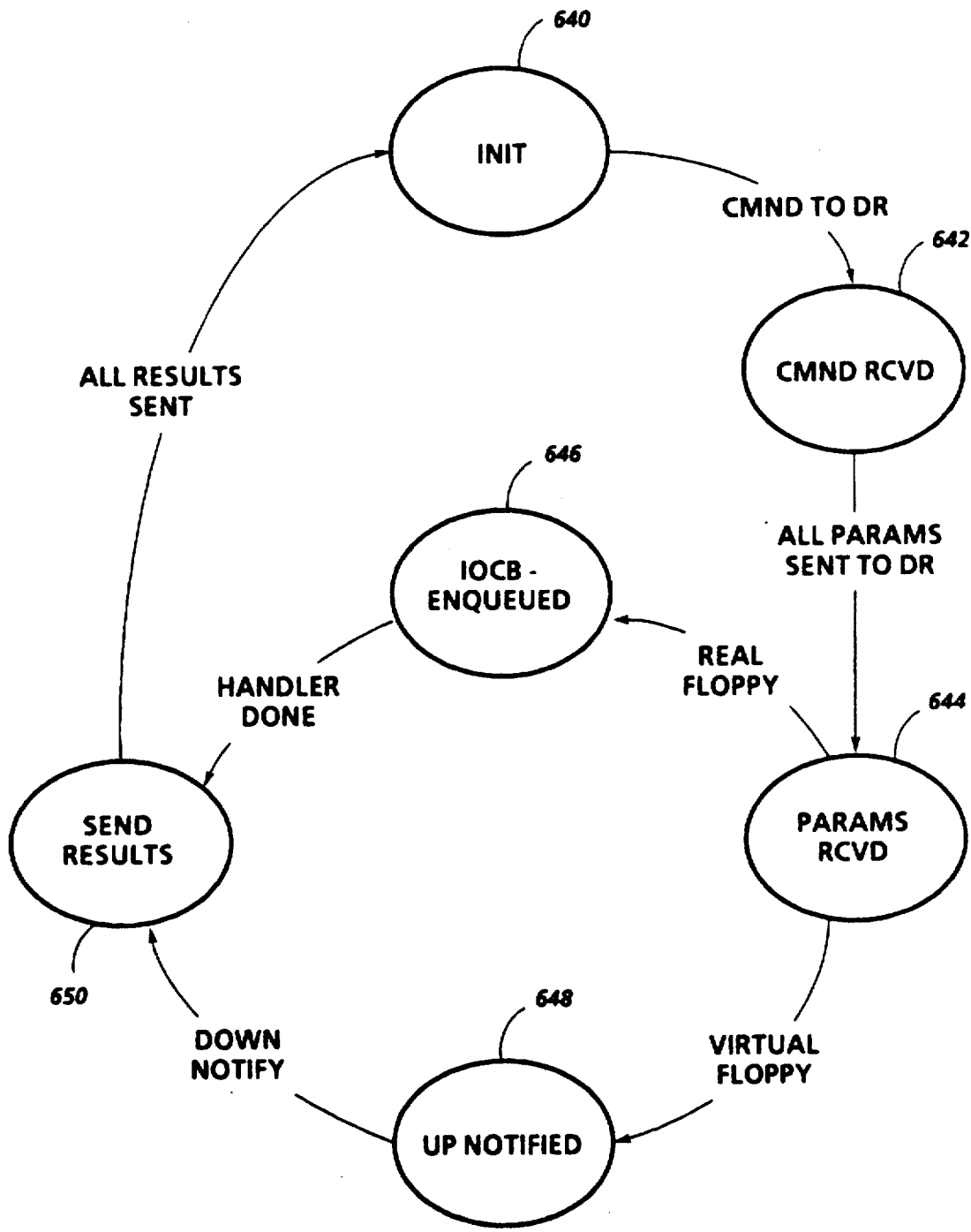
FIG. 22 is a state and transition diagram for the floppy disk emulator of FIG. 12.
Figure 23:
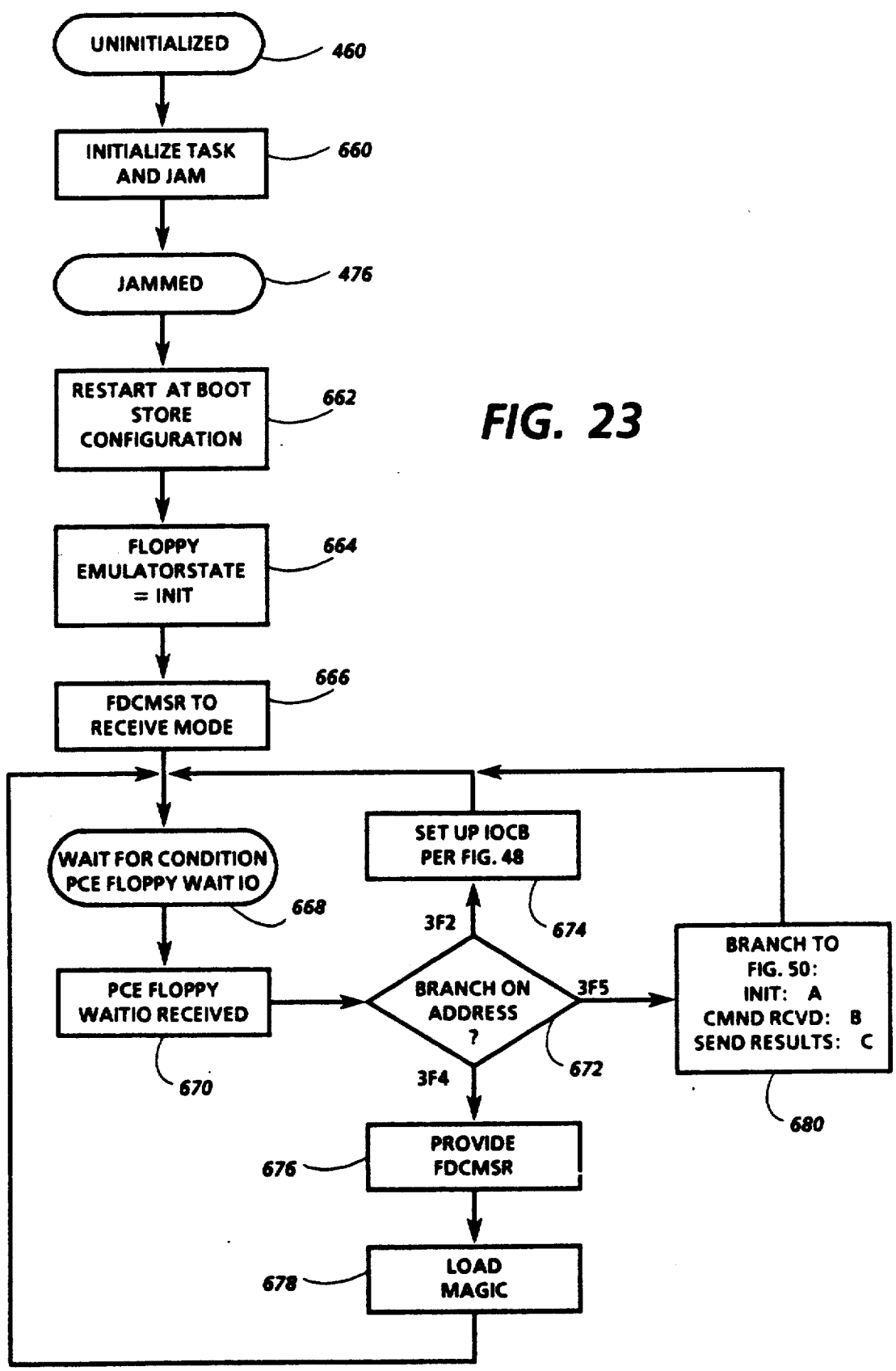
FIG. 23 is a flowchart of the floppy emulator IOP task.

In performing the operations described above, the floppy emulator handler goes through a number of states corresponding to states of the FDC. The current state of the emulator handler is indicated by a value FloppyEmulatorState stored in I/O region 478 and the emulator handler determines how to respond to a notify from Dispatcher 410 based on the current FloppyEmulatorState. FIG. 22 is a state diagram showing the values of FloppyEmulatorState and the transitions between them. FIGS. 23-26 are flow charts showing the steps which correspond to the transitions in more detail and relating the states in FIG. 22 to the states of the emulator handler task as shown in FIG. 14.

FloppyEmulatorState begins with the value Init, in box 640 in FIG. 22. It reaches Init, however, only after a series of steps in FIG. 23, beginning with the floppy emulator handler task's unInitialized state 460, discussed above in relation to FIG. 14. The task is initialized and jammed in box 660.

From Jammed state 476, the task is restarted in box 662 when PCE CPU 210 is being booted, and information about the configuration selected by the user is stored, including the size of PCE memory, the number of the drive which is the physical floppy disk drive, and the handles or access codes for the emulated floppy disk drives which can access virtual floppy disks. Any virtual floppy disks are meanwhile opened and set up by processes on Mesa CPU 112. Finally, FloppyEmulatorState is set to Init, in box 664, and FDCMSR is set to its receive mode in box 668, reflecting that the emulated FDC is ready to receive a command. Then the emulator handler task enters its waitForCondition state in box 668, awaiting the notify pceFloppyWaitIO from Dispatcher 410 indicating an I/O request for a floppy operation.

FIG. 22 shows a transition CmndtoDR from the Init state, box 640, to CmndRcvd state, box 642. During this transition, the floppy emulator handler task executes through the remainder of FIG. 23, and on to FIG. 26. When the notifyPCEFloppyWaitIO is received in box 670, causing the task to execute, the trapped address, data and status from PCE CPU 210 will be received from Dispatcher 410, and the task will branch on the address, in box 672, as in boxes 512 and 514 in FIG. 18.

Figures 24, 25:
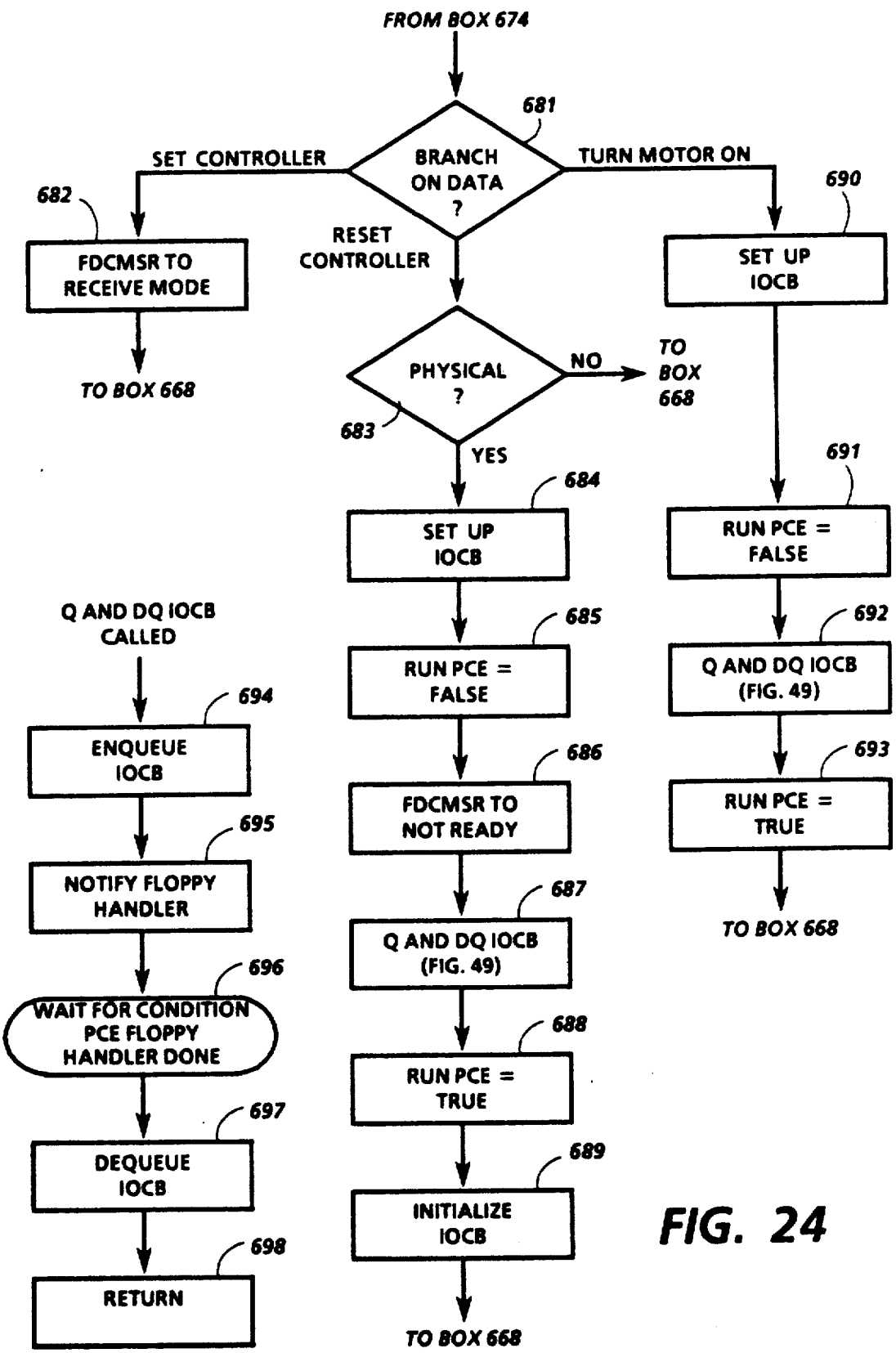
FIG. 24 is a flowchart of the step of setting up the IOCB in the task of FIG. 23.
FIG. 25 is a flowchart of the routine QandDQIOCB which is called within the floppy emulator task of FIG. 23.

If the address received from PCE CPU 210 is 3F2h, the task will, in box 674, set up the floppy IOCB in I/O region 478 according to the steps in FIG. 24, after which the task will again wait for pceFloppyWaitIO in box 668. If the address is 3F4h, the system routine will provide FDCMSR from I/O region 478 as an input signal, in box 676, and will call LoadMagic in box 678, so that the status of the emulated FDC will be available to PCE CPU 210 when it performs the NMI correction routine, as discussed above. Then the task will again wait for pceFloppyWaitIO in box 668. If the address is 3F5h, the system routine will branch in box 680 to a corresponding step shown in FIG. 26 based on the value of FloppyEmulatorState before again waiting for pceFloppyWaitIO in box 668.

From box 674, FIG. 24 begins with a branch based on the trapped data from PCE CPU 210, in box 681. Three possible branches are shown, in which the data indicates a request that the controller be set, that the controller be reset, or that the motor in the floppy disk drive be turned on.

If the controller is to be set, the FDCMSR is changed to its receive mode, in box 682, before returning to wait for pceFloppyWaitIO in box 668.

If the controller is to be reset, the test in box 683 first determines whether a physical floppy drive is present in the configuration of PCE CPU 210 selected by the user. If not, there is no need to reset the FDC controller, since all floppy disk operation will relate to virtual floppy disks, and the FDC controller will not be used. But if a physical floppy drive is present, the IOCB is set up in box 684 with values appropriate to reset the controller, RunPCE is set false in box 685 to hold PCE CPU 210, and FDCMSR is changed to its not ready value, in box 686. A routine QandDQIOCB, discussed below in relation to FIG. 25, is then called in box 687 to provide the IOCB to the floppy handler task on IOP 160. Upon completion, RunPCE is set true in box 688 and the IOCB is initialized in preparation for future operations in box 689 before returning to wait for pceFloppyWaitIO in box 668.

If the motor is to be turned on, the IOCB is set up in box 690 with values appropriate to turn the motor on and RunPCE is set false in box 691. QandDQIOCB is called in box 692 to provide the IOCB to the floppy handler task. Upon completion, RunPCE is set true in box 693 before returning to wait for pceFloppyWaitIO in box 668.

QandDQIOCB is shown in more detail in FIG. 25. The IOCB is first enqueued on a queue of IOCBs waiting for servicing by the floppy handler task on IOP 160. Then a notify is sent to the floppy handler task so that, if it is waiting, it will begin emptying the queue. QandDQIOCB is called only within the floppy emulator handler task, and it then enters a waitForCondition state of that task, in box 696, awaiting a notify from the floppy handler that it has processed the IOCB, pceFloppyHandlerDone. Then QandDQIOCB dequeues the processed IOCB in box 697 and returns control to the routine which called it in box 698. QandDQIOCB is called not only in boxes 687 and 692, discussed above in relation to FIG. 24, but also during the routine described below in relation to FIG. 26, which is called when the I/O request includes the address 3F5h.

As discussed above in relation to FIG. 23, when PCE CPU 210 provides the address 3F5h, the floppy emulator handler task branches based on the FloppyEmulatorState, as shown in box 680. The branch takes it to a corresponding step in the sequence shown in FIG. 26, indicated by A, B or C, corresponding respectively to Init, CmndRcvd and SendResults.

Figure 26:
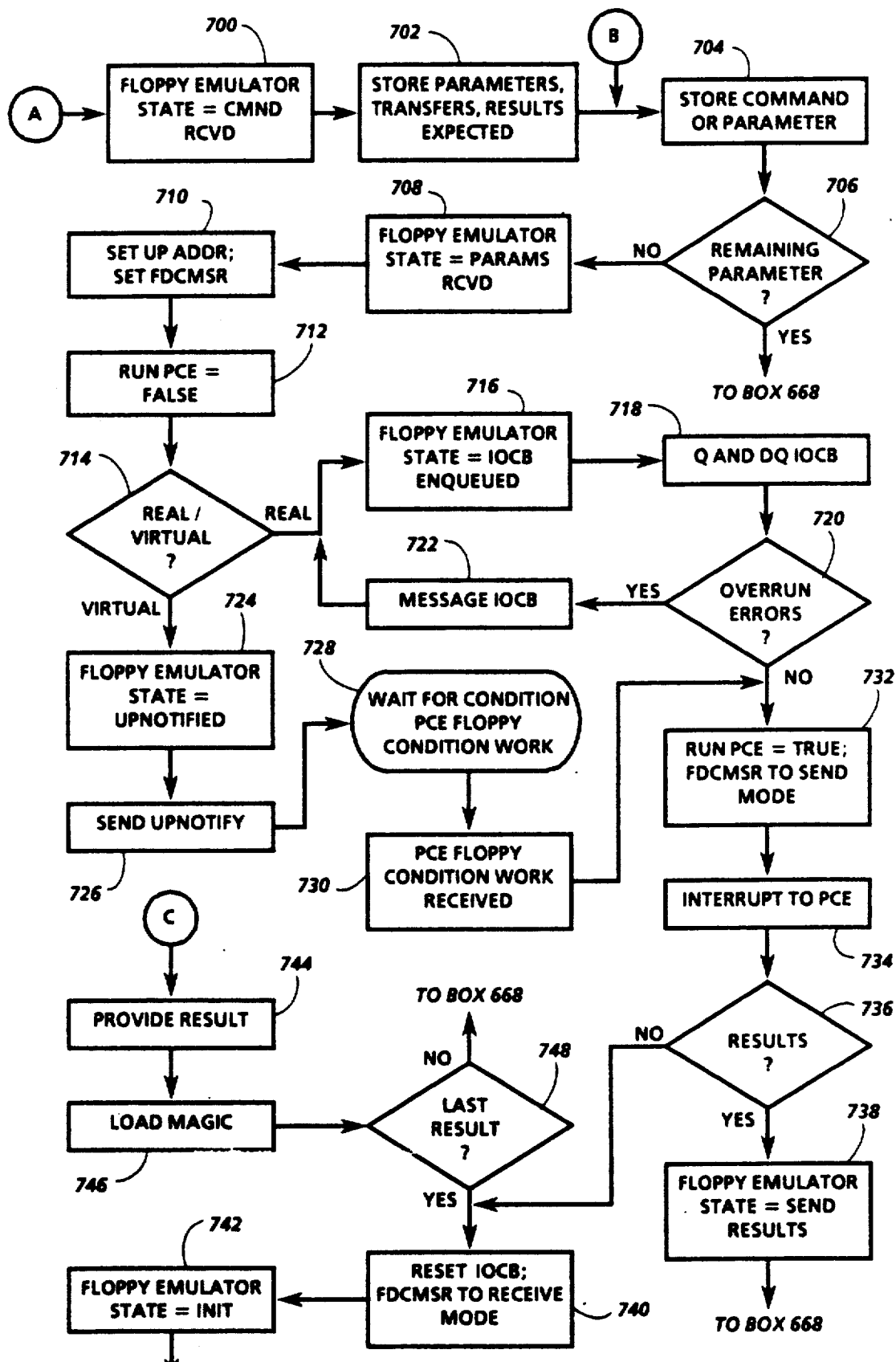
FIG. 26 is a flowchart of the branch based on the emulator state in the task of FIG. 23.

If FloppyEmulatorState is Init, it will first be changed to CmndRcvd, in box 700 in FIG. 26. If the command received from PCE CPU 210 is a valid command having expected numbers of parameters and results and expected data transfers, the expected values will be stored in I/O region 478, in box 702. The command itself is stored in box 704, or, if the FloppyEmulatorState was CmndRcvd when the address 3F5h was received, the parameter received is stored. The test in box 706 will then determine whether at least one parameter is still expected, which will be false if no parameters were expected or if a number as great as the number expected has been received. If there are any remaining parameters, the handler task returns to box 668 in FIG. 23 to wait for pceFloppyWaitIO.

When the last parameter is received, FloppyEmulatorState will be set to ParamsRcvd in box 708. The emulator handler task may in box 710 call a routine SetUpAddr to set up the byte count of the number of bytes to be transferred and to set the address fields in the IOCB, checking in the process to make sure the addresses provided are within the PCE memory determined at boot. SetUpAddr obtains the byte count and addresses from pceDMAData and pceDMAPages, discussed above. The emulator handler task also sets FDCMSR based on the trapped data from PCE CPU 210, with two bits indicating whether the FDC is not ready, in its receive mode or in its send mode; one bit indicating whether the FDC is busy, which is turned on if the command from PCE CPU 210 is not a seek; and four bits each indicating that a seek command is directed to a respective one of four floppy drives. RunPCE is set false in box 712 to prevent PCE CPU 210 from executing instructions.

At this point FloppyEmulatorState is changed to ParamsRcvd, box 644 in FIG. 22, and the IOCB has been completed. The test in box 714 in FIG. 26 determines whether the floppy disk drive specified by the command is the physical drive for accessing a real floppy or an emulated drive for accessing a virtual floppy.

If a real floppy is to be accessed, FloppyEmulatorState is set to IOCBEnqueued in box 716, moving to box 646 in FIG. 22. Then, in box 718, QandDQIOCB is called as in FIG. 25. During the execution of QandDQIOCB, the floppy handler provides the IOCB to the physical FDC, which is the same as the FDC in an IBM PC. The floppy handler has two queues, one for IOCBs directly from the floppy emulator handler or other tasks on IOP 160 and one for IOCBs from Mesa CPU 112. The floppy handler makes use of a built-in DMA channel on IOP 160 to perform DMA operations. The floppy handler provides a notify pceFloppyHandlerDone upon completion, and, as discussed in relation to FIG. 25, the emulator handler task dequeues the IOCB upon receiving this notify. The test in box 720 then determines whether the dequeued IOCB indicates that an error, and specifically an overrun error, occurred. If so, the IOCB is massaged in box 722 and another attempt is made to have the IOCB processed, beginning with box 716. This retry may have a maximum number of attempts, such as three.

If a virtual floppy is to be accessed, FloppyEmulatorState is set to UpNotified in box 724, moving to box 648 in FIG. 22. Then, in box 726, an upnotify is sent to Mesa CPU 112, the upnotify bit indicating that a virtual floppy operation is requested. The emulator handler task then, in box 728, enters a waitForCondition state awaiting a downnotify pceFloppyConditionWork from Mesa CPU 112, indicating completion of processing of the IOCB. The Mesa procedure for virtual floppy operation receives the IOCB, identifies the specific floppy command, sets up the parameters needed to carry it out, and calls a routine corresponding to the command. This routine then calls a virtual floppy controller procedure to service the command, as discussed in greater detail below. When the command has been serviced, any error conditions are stored in the IOCB, after which the downnotify pceFloppyConditionWork is sent to IOP 160 for the floppy emulator handler task.

When the floppy emulator handler task receives pceFloppyConditionWork, it sets RunPCE true in box 730 or determines in box 720 that there were no overrun errors, it proceeds to set RunPCE to true and FDCMSR to its send mode, in box 732. An IOP interrupt may be sent to PCE CPU 210 to indicate completion of the floppy operation in box 734. Before stopping, however, the handler task tests in box 736 whether any results were returned from the floppy operation. If so, FloppyEmulatorState is set to SendResults in box 738, as shown in box 650 in FIG. 22, before returning to wait for a notify pceFloppyWaitIO in box 668 in FIG. 23. If not, the IOCB is reset and the FDCMSR is set to its receive mode, in box 740, in preparation for the next command. Then FloppyEmulatorState is set to Init in box 742, before returning to wait for a notify pceFloppyWaitIO in box 668.

If FloppyEmulatorState is set to SendResults in box 738, the next 3F5h IN request from PCE CPU 210 will lead to C in FIG. 26. In box 744, the emulator handler task provides a result from the IOCB as an input signal, and calls LoadMagic in box 746 to load it into PCE memory for the NMI correction routine. If the test in box 748 determines that the last result has been sent, the IOCB will be reset in box 740, and so forth as described above for the case in which there are no results. Otherwise, the task returns to wait for a notify pceFloppyWaitIO in box 668.

The virtual floppy controller, mentioned above, provides access to a virtual floppy, which is a file in the filing system of host system 16 which is also accessible as if it were a memory medium, in this case as if it were a floppy disk. Another such memory medium file is the emulated rigid disk, discussed below. These memory medium files provide an important technique for transferring large quantities of data between the control of Mesa CPU 112 and PCE CPU 210. The transfer technique is discussed in detail in coassigned application Ser. No. 856,525, now U.S. Pat. No. 4,899,136, incorporated herein by reference.

As used herein, a filing system is any means in a data processing system which permits operations on units of data by name without reference to location in memory. The filing system converts the names into memory locations and makes the data available for an operation being performed. As used herein, a file is a unit of data within a filing system. Objects, documents, folders, and file drawers are all examples of files which may be operated on by name in the filing system. The filing system makes it possible to operate on a file by name by storing and updating a relationship between the file name and the location of the corresponding data, which will be stored somewhere within the data processing system. A file may be fragmented, so that it may not be stored in one contiguous block of memory, but the filing system typically treats the file as if it were one contiguous block. An operating system may assist in managing the fragments, storing the relationships between the file fragments and their locations in memory, making the file appear as a contiguous block. Subfiles within the file may be accessed with the file name and the subfile name.

A memory medium file which can be accessed either as a file or as a memory medium could be created in any of a multitude of filing systems currently in use. The filing system of the 6085 on which memory medium files have been implemented according to the invention resembles many filing systems in that it uses a rigid disk for the storage of most files. Coassigned application Ser. No. 856,525, now U.S. Pat. No. 4,899,136 discusses the manner in which files called objects may be made available to a user for manipulation using an application called the Desktop on the 6085. Within the system, however, each of these objects, like any other file, is accessible on the basis of its name or a file handle equivalent to that name which is used within the system to refer to the file. Therefore, from the point of view of the user, a virtual floppy or an emulated rigid disk will be an object which can be manipulated on the Desktop, while from the point of view of Mesa CPU 112 these objects will be files within its filing system and from the point of view of PCE CPU 210 these files will be memory mediums.

Procedures on the Mesa CPU 112 can be used to access the memory medium file as a file in the conventional manner and to interpret the information on an accessed file and provide it for display on the desktop. The interpreter procedure will be able to further access the file to obtain the information to be interpreted and also to convert the information obtained into a form capable of being displayed as a part of the Desktop display. This interpreter need not, however, be a part of the memory medium file and must, in order to be effective, be specific to the format and encoding of the data in the memory medium file.

FIG. 50A shows basic functional steps in the creation of a memory medium file and the management of data in a memory medium file. In box 870, the file is set up in the filing system within the data processor being used. This will follow the standard procedures for that filing system, and may involve setting up attributes of the file such as its name, file type, and so forth. Then, in box 872, a data structure is associated with the file which makes it possible to retrieve the location of a unit of data within the file by providing the memory medium address or location of that unit of data. This data structure will perform its mapping function when an I/O operation request for that file is received.

A subsequent step, in box 874, is to allocate to a unit of data a unit of the file, storing the location of that file unit in the data structure so that it will be retrieved when a memory medium location of that data unit is received. Once the file unit has been allocated, the data itself may be stored in that file unit, in box 876. For example, once a track of a virtual floppy file has been allocated, data may be stored in that track. Thereafter, in order to access the data, its memory medium location is provided to the data structure, retrieving from the mapping data structure the location within the file of the file unit where the data is stored, in box 878. Using the location, the data may then be accessed, in box 880.

Figure 26A:
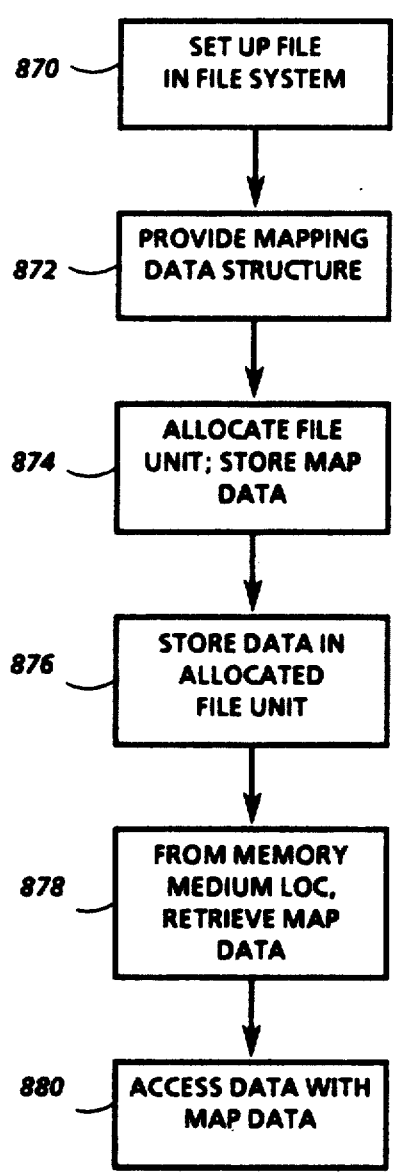
FIG. 26A is a general flowchart showing functional steps by which a memory medium file such as a virtual floppy is created and managed.

The functional steps in FIG. 26A will occur in the creation of a memory medium file and the management of its data, but they may be implemented so as to occur in a variety of ways. If the memory medium is a rigid disk, then one implementation would be to allocate a file unit to each sector of the rigid disk at the time the data structure is provided, storing the location of the file unit corresponding to each sector in the data structure. Subsequently, the emulated rigid disk file may be accessed simply by retrieving the location of the file unit corresponding to a sector being addressed from the data structure. Data may be stored in that file unit, and that data may be read and rewritten.

Figure 26B:
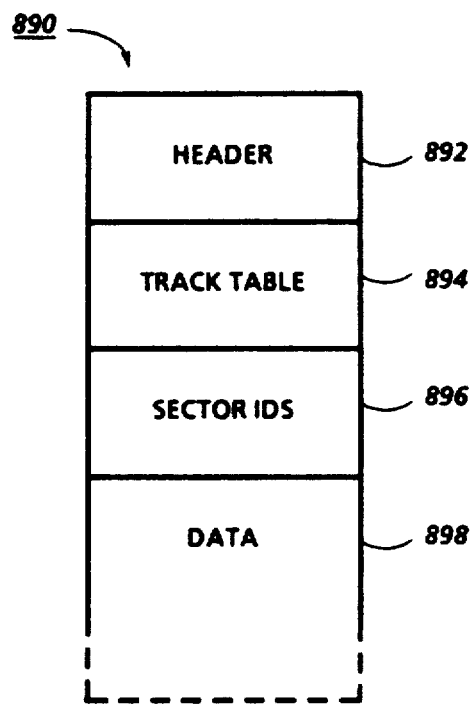
FIG. 26B shows the contents of a virtual floppy.

If the memory medium is a floppy disk, however, it may be more appropriate to implement it differently, in order to accommodate the variable sector size and identification typical of floppy disks. FIG. 26B shows the structure of a virtual floppy file 890 according to such an implementation.

Virtual floppy file 890 includes header 892, containing general information about the virtual floppy file, including a key which uniquely identifies it, a field indicating single or double sided format, the number of tracks formatted and the current size of the virtual floppy file. The size of the virtual floppy file according to this implementation may vary, because its space is allocated based on an estimate of space needed.

Virtual floppy file 890 also includes track table 894 which contains one element for each track the virtual floppy file may have. If the heads of the emulated floppy drive are assigned the values 0 and 1 and the cylinders are assigned integer values beginning with 0, each track will have an address based on the cylinder in which it is located and the head which accesses it defined by (2×cylinder)+head, and this address determines the position of that track's entry in track table 894. The track entry will include the size of the sectors on the track, flags with characteristics of the track, the number of sectors on the track, a filler byte value stored in the track when formatted but not yet written, an offset indicating the location of the track's allocated unit of the file within the file, and a pointer used to map the track into virtual memory of host system 16. The flags will include a dirty flag indicating whether the track has been written or read and an IDsaved flag indicating whether the sector IDs for the track have been saved, as discussed below.

Virtual floppy file 890 includes sector IDs 896 for sectors which have special sector IDs. These special sector IDs are necessary to locate those sectors within a track. On a real floppy, the sector ID is stored immediately before the data in the sector, but in the virtual floppy file, the sector ID for any sector which has a sector ID other than its order within the track is stored in the sector IDs 896, together with the location of that sector within the track. Sector IDs 896 also permit retrieval of the sector ID of a given sector based on the order of that sector within the track.

The final part of virtual floppy file 890 is the data 898, containing all the tracks to which units of the file have been allocated. In general, the track numbered 0 is allocated immediately, with other tracks being allocated as needed.

Figure 26C:
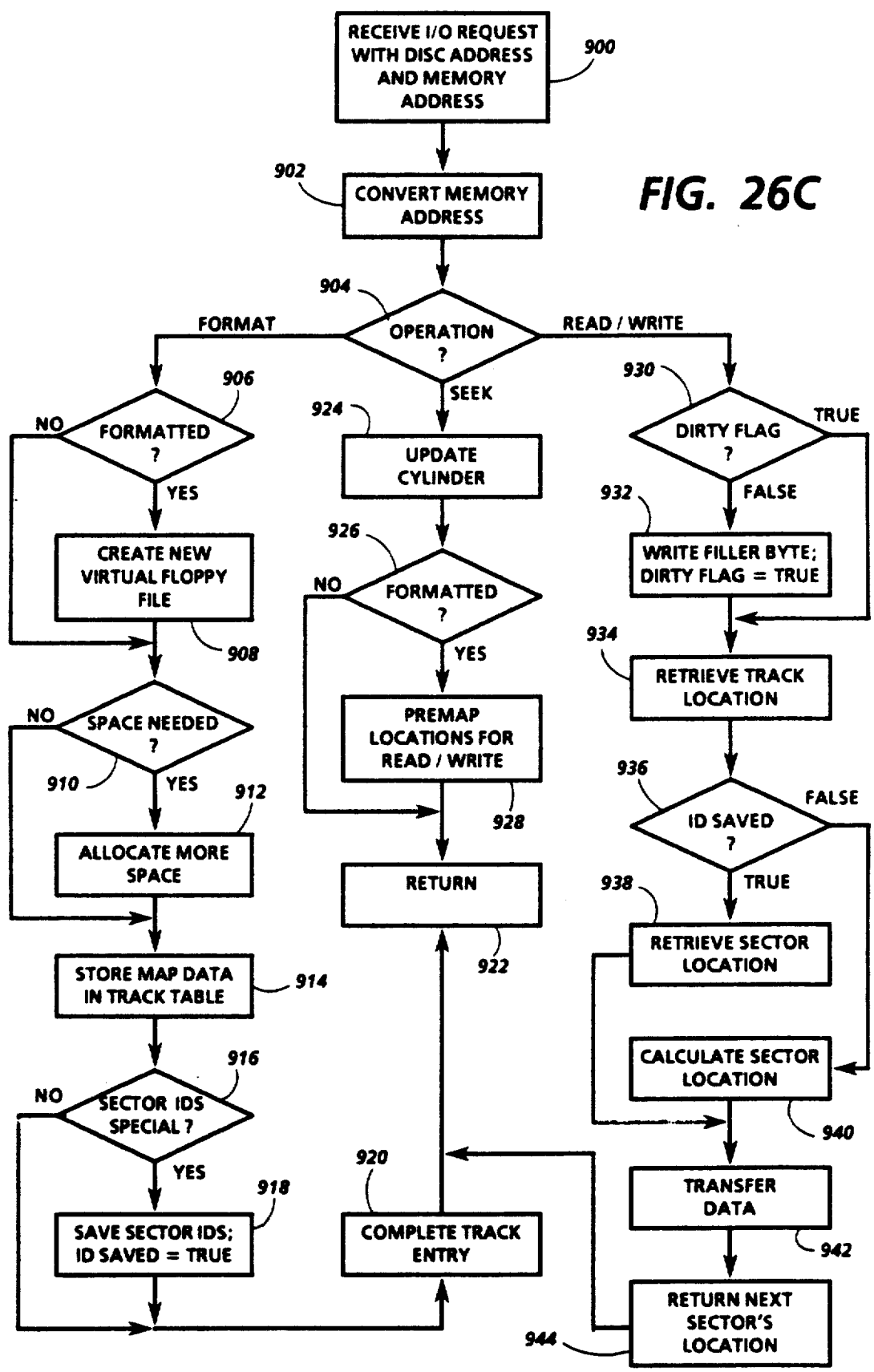
FIG. 26C is a flowchart of the operations of an emulated floppy disk controller which accesses the virtual floppy of FIG. 50B.

FIG. 26C is a flowchart showing the steps followed by a controller procedure which handles I/O operation requests to a virtual floppy file, and therefore serves in a sense as an emulated floppy disk controller. This procedure is called with the I/O request, which may include a disk address of a cylinder, track or sector, and a memory address may be provided indicating the location in the PCE memory with which a data transfer is requested, in box 900. The controller will evaluate whether the request contains a valid command and whether the drive number in the request corresponds to a virtual floppy file before proceeding. If a memory address is received, that address is converted in box 902 from the PCE address to a virtual address which can be applied to memory by Mesa CPU 112 in order to access the location in PCE memory. Then, in box 904, a branch is taken based on the operation requested. FIG. 26C illustrates the frequently requested operations format, seek and read or write.

If the request is for a format operation of a track whose address is provided, the controller will access that tracks entry in track table 894 to determine whether it has been formatted, in box 906. If so, the old virtual floppy file is deleted, and a new file is created in box 908, since reformatting a track clears a floppy. In box 910, the controller determines whether the previously allocated space for data 898 is sufficient to include the track to be formatted. If more space is needed, more space is allocated in 912, the controller allocating space based on the possible number of tracks remaining to be formatted. Then, space is allocated to this track, and the map data necessary to access that space within the file is stored in the track table in box 914. The test in box 916 then determines whether the IDs of the sectors in the track being formatted are special. If so, the sector IDs are saved in sector IDs 896, and the ID saved flag is set true, in box 918. Then, the data entry is completed in box 920 before returning to the routine which called the controller in box 922.

If the request is for a seek operation, the controller updates its own stored value for the cylinder number in box 924. The controller stores a number of values of importance to its operations, including a cache of tracks mapped into memory, which saves time by holding the cached tracks for subsequent use without the necessity of remapping. This mapping is a mapping to Mesa CPU virtual addresses, and is not the same as the mapping into the virtual floppy file using track table 894. The controller tests in box 926 whether the track has been formatted, which would permit it to be mapped to virtual addresses. If so, a mapping to virtual addresses is performed in box 928, and stored in the cache described above, so that subsequent read and write operations will be more efficient. Then, the controller returns to the routine which called it in box 922.

If the request is for a read or write operation, substantially the same sequence of steps is taken. The controller tests the dirty flag in box 930, and, if it is still false, its initial value, the filler byte is written into the track and the dirty flag is set true, in box 932, which saves time during the format operation. The controller uses the floppy disk address received in box 900 to retrieve the track location in the virtual floppy file from the track table 894 in box 934. Then, the controller checks the IDsaved flag of the track in box 936. If the flag is true, the sector location is retrieved from sector IDs 896, in box 938, but if false, the sector location is calculated based on the position of the sector in the order of sectors within the track and on the length of the sectors on the track, in box 940. Then the data is transferred in box 942 to or from that sector, and if the length of the data to be transferred, as received with the request, is greater than one sector from following sectors to the end of the track and around to the beginning of the track again until the transfer is completed. The transfer is to or from the virtual address in memory determined in box 902. When the transfer is completed, the next sector's location is returned in box 944 and the controller returns to the routine which called it in box 922. The location of the next sector is returned to assist in emulating the DMA controller, and may be provided to PCE CPU 210 in response to an I/O operation request for its value.

A memory medium file such as the virtual floppy may be used to transfer data from the control of one of Mesa CPU 112 and PCE CPU 210 to the other. The steps include receiving a signal from the user through the user interface selecting the virtual floppy to be transferred while it is under the control of one of the processors, receiving another signal indicating a destination which is the other processor, and providing the virtual floppy to the destination processor so that it has control of the virtual floppy. For example, if the virtual floppy is accessed through an object on the display such as an icon of the type described in coassigned application Ser. No. 856,525, now U.S. Pat. No. 4,899,136, that icon may be selected by mouse operations. If the icon is on the Desktop portion of the display, it is under control of Mesa CPU 112, and by moving or copying it to another display object representing an emulated floppy drive which is a procedure for accessing the virtual floppy as a floppy disk, the user may indicate that the destination is the emulating processor. The virtual floppy is then provided to the emulating processor and placed under its control.

From the above, it can be seen that memory medium files such as the virtual floppy file could be implemented in various ways. The emulated rigid disk file, discussed briefly above, is an example which is somewhat simpler than the virtual floppy file, since it only requires a fixed mapping table from rigid disk addresses to the emulated rigid disk file. We turn now to the rigid disk drive emulator itself.

5. Rigid disk drive emulator. The IBM PC XT, one variant of the IBM PC, may include a rigid (also called hard or fixed) disk. Also, a number of rigid disk controllers (RDCs) may be used in the IBM PC without the XT option or in other PC compatible machines. Therefore, the sequence of I/O requests to access the rigid disk depends on the specific RDC present in the system. As a result, each RDC is run by software which converts a set of requests to the rigid disk into signals which, when applied to that RDC, produce the desired I/O operation. This software is stored on an auxiliary ROM, also referred to as Fixed Disk ROMBIOS. The RDC vendor usually provides this auxiliary ROM with the Fixed Disk ROMBIOS along with the RDC.

The Xerox 6085, which may be modified according to the present invention to emulate the IBM PC XT, always includes a hard disk, and the 6085 hard disk also operates in its own unique way. Emulation of the rigid disk drive on the IBM PC makes use of this 6085 hard disk. The rigid disk emulator includes not only specially written BIOS software similar in function to Fixed Disk ROMBIOS but also includes an emulator handler task which is called by Dispatcher 410 and procedures executed by Mesa CPU 112 when it receives an upnotify from the emulator handler task. The use of specially written BIOS software simplifies rigid disk emulation, but the rigid disk could also be emulated using the same general approach used in floppy emulation and the emulation of other I/O devices.

The specially written BIOS software for the Xerox 6085 hard disk (XBIOS) differs from the remainder of the ROMBIOS used in emulating the IBM PC according to the invention. The remainder of the ROMBIOS may be any BIOS which meets the functional specifications of the standard IBM PC ROMBIOS, while XBIOS, in effect, provides an interface between the software run on PCE CPU 210 and the 6085 hard disk. Nonetheless, XBIOS is stored like the ROMBIOS on the 6085 hard disk prior to booting of PCE CPU 210, and if the user selects a configuration which includes the emulated rigid disk drive XBIOS is copied into the PCE region of main memory 126 during booting, like the ROMBIOS, and initialized. Then, during operation of PCE CPU 210, XBIOS is called upon execution of an instruction requesting rigid disk operations, and generates I/O requests which, when received by IOP 160, result in the requested operations.

XBIOS has two routines, an initialization routine and an interrupt routine, performed whenever a rigid disk operation is requested. The initialization routine is called by the ROMBIOS if it determines during initialization that XBIOS has been loaded. This is indicated by the first word of the portion of PCE memory into which XBIOS would be loaded. The initialization routine replaces the floppy interrupt vector with the rigid disk interrupt vector, so that an instruction INT 13h will call the XBIOS interrupt routine. The floppy interrupt vector is stored elsewhere to be able to invoke the floppy interrupt routine. The initialization routine then provides an I/O OUT request with the address 322h and with data indicating the offset of a region of PCE memory called diskRegs which is used for transfer of data relating to the emulated rigid disk between PCE CPU 210 and IOP 160. After IOP 160 responds to the 322h OUT request, the initialization routine will continue by sending a 322h IN request to obtain the emulated rigid disk (ERD) size from IOP 160. XBIOS will store the ERD size received in a disk parameter table in PCE memory, thus completing the XBIOS initialization routine.

The interrupt routine is executed in two parts whenever PCE CPU 210 executes INT 13h, as noted above. Prior to executing INT 13h, PCE CPU 210 loads parameters for a rigid disk operation into its AX, BX, CX, DX, and ES registers. The first part of the interrupt routine first tests the contents of these registers to determine whether a rigid or floppy disk operation is requested. If a floppy operation, the floppy interrupt routine from the ROMBIOS is called. But if a rigid disk operation is requested, the contents of these registers are loaded into diskRegs in PCE memory and a 320h OUT request is provided, after which PCE CPU 210 enters a wait state. PCE CPU 210 waits for a disk interrupt from its interrupt controller, which will be provided by IOP 160 when it completes the requested rigid disk operation. Upon receiving the disk interrupt, the second part of the interrupt routine is called, and it loads values stored in diskRegs by IOP 160 back into the registers of PCE CPU 210 before returning control to the routine which called the interrupt routine with INT 13h.

Figure 27:
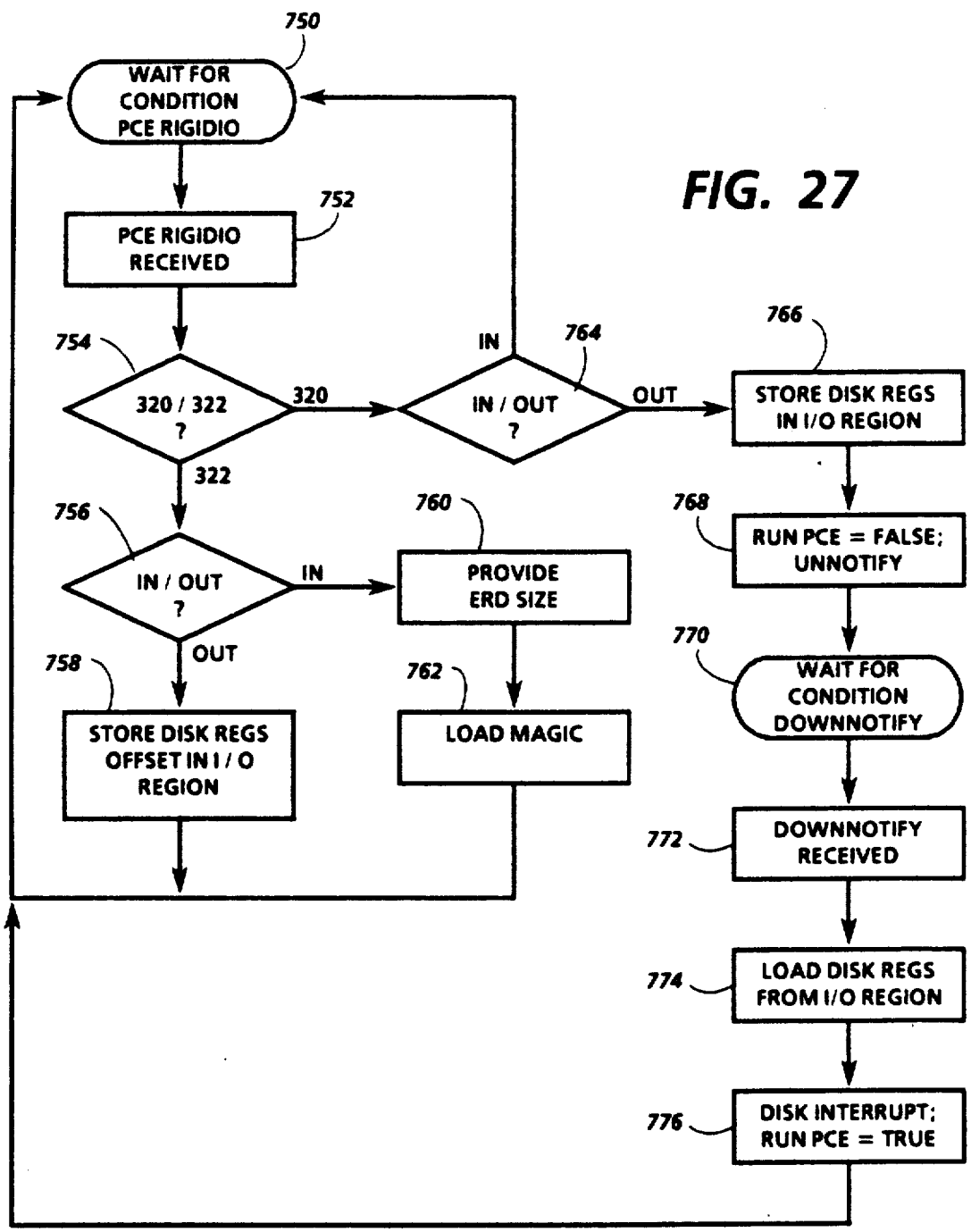
FIG. 27 is a flowchart of an IOP task within the fixed or rigid disk emulator of FIG. 12.

FIG. 27 shows the rigid disk emulator handler task which is notified by Dispatcher 410 when an I/O request with an address of 320h or 322h is received from PCE CPU 210. The emulator handler task ordinarily remains in its waitForCondition state awaiting a notify pceRigidIO from Dispatcher 410. As described in relation to boxes 510 and 512 in FIG. 18, when the task receives the notify pceRigidIO in box 752, it also receives the address, data and status from Dispatcher 410 and then branches on the address, as shown in box 754.

If the test in box 754 determines that the address is 322h, sent by the initialization routine of XBIOS, the status lines are tested in box 756 to determine whether an IN or OUT request was received. If an OUT request, the data from PCE CPU 210 is an offset for diskRegs in PCE memory, and is stored in I/O region 478, in box 758. But if an IN request, the task retrieves the ERD size from I/O region 478 and provides it as an input signal in box 760, calling LoadMagic in box 762 to load it into MagicDataStructure in PCE memory. In either case, the task returns to box 750 to wait for another notify pceRigidIO from Dispatcher 410.

If the test in box 754 determines that the address is 320h, sent by the interrupt routine of XBIOS, the status lines are similarly tested in box 764 to determine whether an IN or OUT request was received. If an IN request, it is treated as a no op, and the task returns to box 750 to wait for a notify. But if an OUT request, the task stores diskRegs from PCE memory in I/O region 478 in box 766 and sets RunPCE to false and sends an upnotify to Mesa CPU 112 requesting an emulated rigid disk operation, in box 768. The task enters its waitFor-ConditionState in box 770, waiting for a downnotify from Mesa CPU 112 indicating completion of the rigid disk operation. When the downnotify is received in box 772, the task loads diskRegs in PCE memory from I/O region 478, to provide any error and status data from the rigid disk operation, in box 774. In box 776, the system routine sends a disk interrupt to PCE CPU 210 via the programmable interrupt controller (PIC) 330, discussed in copending U.S. patent application Ser. No. 856,526, now abandoned incorporated herein by reference, and sets RunPCE true. Then the task returns to box 750 to wait for a notify pceRigidIO from Dispatcher 410.

When Mesa CPU 112 receives an upnotify requesting an emulated rigid disk operation, an appropriate procedure for handling the request will be called based on the information in I/O region 478. The procedure called may not require interaction with the ERD region of the 6085 hard disk, such as procedures responding to requests to verify sectors, initialize the drive, seek and recalibrate, all of which are essentially no ops to which status data indicating successful completion are returned. The procedure responding to read status returns the status of the previous operation before returning the successful completion status.

If the procedure involves the ERD itself, the ERD is accessed through an interface consisting of a set of public procedures within the Mesa workstation software. Such procedures include format commands or write sector commands which change the ERD, read sectors which retrieve information from ERD to PCE memory, and return drive parameters which obtains data about the configuration of the ERD and returns it in I/O region 478.

Some procedures involve the ERD system buffer, a region within the ERD which holds information about the ERD. Read sector buffer transfers one sector's worth of information from ERD system buffer into PCE memory, while write sector buffer does the reverse. The ERD system buffer is also used in formatting a single track or the whole ERD, in which case data is copied from the system buffer into the designated section of ERD.

Rigid disk emulation as described above involves predominantly transfer of data between the ERD region of the 6085 hard disk and the PCE memory.

Further Developments

The embodiments of the invention described above may be modified in many ways within the scope of the invention. Host system 16 itself need not be a Mesa system, but could be any other system capable of performing the functions described above. The architecture of Host system 16 could be modified in many ways, including consolidating Mesa CPU 112 into a single VLSI chip, and similarly providing each memory/display controller on a single VLSI chip for each bank of memory.

The degree to which the emulating processor can execute a sequence of instructions executable by the IBM PC or other emulated system depends on the level at which those instructions are written. If directed to the ROMBIOS, those instructions will be executable to the extent the ROMBIOS loaded into PCE memory can execute them. The modifications to ROMBIOS noted above for emulation should not change the ability to execute instructions. Some sequences of instructions which bypass the ROMBIOS or are otherwise unconventional may not be executable, however. In general, loadable applications and operating systems executable on an IBM PC should be executable by a system emulating as described above, in distinction to a modified ROMBIOS which may not be executable. It is within the scope of the invention, however, to modify the ROMBIOS loaded into PCE memory to make it capable of executing other sequences of instruction or conversely to make it capable of executing fewer sequences of instructions but more efficiently. Furthermore, modifications to provide signals such as the MCS and UCS signals, as described above, are also within the scope of the invention.

Many other modifications, variations and improvements will be apparent from the above description, and the scope of the invention is not limited by the description, but only by the attached claims.

What is claimed:

1. A method of managing units of data in a data processing system that includes:
   a data file system;
   file access means for providing file access signals to access files in the data file system, the file access signals including signals indicating locations in the data file system; and
   memory medium access means for providing memory medium access signals to access a memory medium, the memory medium access signals including signals indicating memory medium locations;
   the method comprising steps of:
   setting up a file within the data file system so that the file access means can access the file in the data file system and so that the memory medium access means can also access the file; the step of setting up the file comprising a substep of providing a data structure associated with the file; and
   for each unit of data to be managed, allocating a respective file system unit within the data file system to the file and providing respective mapping data in the data structure, the data unit's mapping data indicating a location of the data unit's file system unit; each data unit's mapping data being accessible with a respective memory medium location so that the data structure responds to a signal from the memory medium access means indicating the data unit's memory medium location by providing data indicating the location of the data unit's file system unit for use by the file access means in accessing the data unit's file system unit.

2. The method of claim 1, further comprising, for each unit of data to be managed, a step of storing the data unit in the data unit's file system unit.

3. The method of claim 2, further comprising, for a first one of the units of data to be managed, steps of:
   accessing the data structure with the first data unit's memory medium location to obtain data indicating the location of the first data unit's file system unit; and
   accessing the file with the data indicating the location of the first data unit's file system unit to access the stored first data unit.

4. The method of claim 1 in which the memory medium is a rigid disk system.

5. The method of claim 1 in which the step of setting up the file comprises allocating at least as much data file system space to the file as the capacity of the memory medium.

6. A method of managing units of data in a data processing system that includes:
   a data file system;
   file access means for providing file access signals to access files in the data file system, the file access signals including signals indicating locations in the data file system; and
   floppy disk access means for providing floppy disk access signals to access a floppy disk having a plurality of tracks, each track having a respective floppy disk location; the floppy disk access signals including signals indicating floppy disk locations of tracks;
   the method comprising a step of:
   setting up a file within the data file system so that the file access means can access the file in the data file system and so that the floppy disk access means can also access the file;
   the step of setting up the file comprising a substep of providing a data structure associated with the file; the data structure including a floppy disk track map for responding to a signal from the floppy disk access means indicating a track's floppy disk location by providing data indicating a location of the track in the data file system for use by the file access means in accessing the data file system.

7. The method of claim 6 in which the step of providing the data structure comprises a substep of providing in the floppy disk track map an indication of each track's format, if any.

8. The method of claim 6 in which the tracks include a plurality of formatted tracks, each formatted track having a plurality of ordered sectors, each with a respective floppy disk location, the step of providing the data structure further comprises a substep of providing a floppy disk location map for mapping the floppy disk location of a sector of a formatted track to the position in order of that sector within that track.

9. The method of claim 8 in which the floppy disk location map is further for returning the floppy disk location of a sector of a formatted track when accessed with the floppy disk location of that track and the position in order of that sector within that track.

10. A data processing system comprising:
    a data file system;
    file access means for providing file access signals to access files in the data file system, the file access signals including signals indicating locations in the data file system; and
    memory medium access means for providing memory medium access signals to access a memory medium, the memory medium access signals including signals indicating memory medium locations;
    means for managing units of data, comprising:
    file setup means for setting up a file within the data file system so that the file access means can access the file in the data file system and so that the memory medium access means can also access the file; the file setup means comprising means for providing a data structure associated with the file; and
    allocating means for allocating, for each unit of data to be managed, a respective file system unit within the data file system to the file; and
    mapping data means for providing, for each unit of data to be managed, respective mapping data in the data structure, the data unit's mapping data indicating a location of the data unit's file system unit; each data unit's mapping data being accessible with a respective memory medium location so that the data structure responds to a signal from the memory medium access means indicating the data unit's memory medium location by providing data indicating the location of the data unit's file system unit for use by the file access means in accessing the data unit's file system unit.

11. The data processing system of claim 9, further comprising controller means for receiving requests for floppy disk I/O operations and for controlling the file in accordance with the requested floppy disk I/O operations.

12. The data processing system of claim 11 in which the controller means further comprises means for storing information necessary to access the file as a floppy disk.

* * * * *